(12) United States Patent
Park et al.

(10) Patent No.: US 9,654,274 B2
(45) Date of Patent: May 16, 2017

(54) SYSTEMS AND METHODS FOR MITIGATING SELF-INTERFERENCE

(71) Applicant: Telefonaktiebolaget L M Ericsson (publ), Stockholm (SE)

(72) Inventors: Chester Park, Seoul (KR); Jung-Fu Cheng, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 348 days.

(21) Appl. No.: 14/074,185

(22) Filed: Nov. 7, 2013

(65) Prior Publication Data

US 2014/0133411 A1 May 15, 2014

Related U.S. Application Data

(60) Provisional application No. 61/724,748, filed on Nov. 9, 2012.

(51) Int. Cl.
*H04W 4/00* (2009.01)
*H04L 5/00* (2006.01)
*H04J 11/00* (2006.01)

(52) U.S. Cl.
CPC ........ *H04L 5/0058* (2013.01); *H04J 11/0023* (2013.01); *H04L 5/0053* (2013.01); *H04L 5/0066* (2013.01)

(58) Field of Classification Search
None
See application file for complete search history.

(56) References Cited

U.S. PATENT DOCUMENTS

| | | | |
|---|---|---|---|
| 6,539,204 B1 * | 3/2003 | Marsh | H04B 1/123 455/296 |
| 2010/0029289 A1 * | 2/2010 | Love et al. | 455/450 |

(Continued)

FOREIGN PATENT DOCUMENTS

WO    2010112066 A1    10/2010

OTHER PUBLICATIONS

Motorola, "R4-100207: Release 10 UE PUCCH/PUSCH configuration," 3rd Generation Partnership Project (3GPP), TSG-RAN Meeting Ad Hoc #2010-01, Jan. 18-22, 2010, 2 pages, Sophia Antipolis, France.

(Continued)

*Primary Examiner* — Chi H Pham
*Assistant Examiner* — Fahmida Chowdhury
(74) *Attorney, Agent, or Firm* — Withrow & Terranova, PLLC

(57) ABSTRACT

Systems and methods for mitigating self-interference at a wireless device in a cellular communications network are disclosed. In one embodiment, a network node obtains one or more self-interference parameters for self-interference at the wireless device within a downlink frequency band utilized by the wireless device. In one embodiment, the one or more self-interference parameters include a frequency location of the self-interference, a strength of the self-interference, or both the frequency location and the strength of the self-interference. The network node then controls uplink transmission by the wireless device, downlink reception by the wireless device, and/or downlink transmission to the wireless device in such a manner that the self-interference at the wireless device is mitigated.

22 Claims, 20 Drawing Sheets

NON-CONTIGUOUS INTRA-BAND CA UL FREQUENCY BAND    NON-CONTIGUOUS INTRA-BAND CA DL FREQUENCY BAND

PCC ON HIGH FREQ. CARRIER
RB ALLOC. ON HIGH FREQ. EDGE

PCC ON HIGH FREQ. CARRIER
RB ALLOC. ON LOW FREQ. EDGE

PCC ON LOW FREQ. CARRIER
RB ALLOC. ON HIGH FREQ. EDGE

PCC ON LOW FREQ. CARRIER
RB ALLOC. ON LOW FREQ. EDGE

(56) References Cited

U.S. PATENT DOCUMENTS

| | | | |
|---|---|---|---|
| 2011/0222455 A1* | 9/2011 | Hou | H04W 52/267 |
| | | | 370/311 |
| 2012/0075989 A1* | 3/2012 | Roessel et al. | 370/230 |
| 2012/0140703 A1* | 6/2012 | Kim et al. | 370/315 |
| 2013/0044621 A1* | 2/2013 | Jung | H04W 72/082 |
| | | | 370/252 |
| 2013/0194984 A1 | 8/2013 | Cheng et al. | |

OTHER PUBLICATIONS

International Search Report and Written Opinion for PCT/IB2013/060005 mailed Feb. 5, 2014, 12 pages.
International Preliminary Report on Patentability for PCT/IB2013/060005, issued May 12, 2015, 7 pages.
Examination Report No. 1 for Australian Patent Application No. 2013343085, issued Sep. 16, 2015, 3 pages.

* cited by examiner

SYSTEMS AND METHODS FOR MITIGATING SELF-INTERFERENCE

RELATED APPLICATIONS

This application claims the benefit of provisional patent application Ser. No. 61/724,748, filed Nov. 9, 2012, the disclosure of which is hereby incorporated herein by reference in its entirety.

FIELD OF THE DISCLOSURE

The present disclosure relates to systems and methods for mitigating self-interference at a wireless device in a cellular communications network.

BACKGROUND

In Long Term Evolution (LTE) Release 8, for Frequency Division Duplexing (FDD) operation, separate uplink and downlink frequency bands are utilized, where the uplink and downlink frequency bands are paired to allow simultaneous transmission in the two frequency bands. The paired uplink and downlink frequency bands have sufficient separation to enable transmitted signals to not unduly impair receiver performance. In LTE Release 10, carrier aggregation is utilized to support bandwidths larger than 20 Megahertz (MHz) while at the same time providing legacy support for LTE Release 8 User Equipment devices (UEs). Specifically, each component carrier has a 20 MHz bandwidth and can be seen by an LTE Release 8 UE as an LTE Release 8 carrier. LTE Release 11 introduces non-contiguous intra-band carrier aggregation.

Carrier aggregation supports simultaneous transmission and reception of multiple carriers from a single UE, which in turn poses serious design challenges. As discussed below in detail, one serious design challenge is UE self-interference wherein an uplink transmission by the UE on an uplink component carrier results in an intermodulation product that falls within a downlink component carrier used by the UE. As such, there is a need for systems and methods for mitigating such self-interference.

SUMMARY

Systems and methods for mitigating self-interference at a wireless device in a cellular communications network are disclosed. In one embodiment, a network node obtains one or more self-interference parameters for self-interference at the wireless device within a downlink frequency band utilized by the wireless device. In one embodiment, the one or more self-interference parameters include a frequency location of the self-interference, a strength of the self-interference, or both the frequency location and the strength of the self-interference. The network node then controls uplink transmission by the wireless device, downlink reception by the wireless device, and/or downlink transmission to the wireless device in such a manner that the self-interference at the wireless device is mitigated.

In one embodiment, the downlink frequency band is a frequency band of one of multiple downlink component carriers utilized by the wireless device in a downlink carrier aggregation scheme, and the self-interference is self-interference in the frequency band of the downlink component carrier resulting from an actual or hypothesized uplink transmission by the wireless device on an uplink component carrier utilized by the wireless device.

Further, in one embodiment, the cellular communications network is a Long Term Evolution (LTE) cellular communications network, and Public Uplink Control Channel (PUCCH) resource allocation for the wireless device is controlled such that self-interference due to a PUCCH transmission by the wireless device is mitigated.

In another embodiment, the cellular communications network is an LTE cellular communications network, and PUCCH transmission by the wireless device is adapted such that self-interference due to a PUCCH transmission by the wireless device is mitigated.

In another embodiment, the cellular communications network is an LTE cellular communications network, and PUSCH resource allocation for the wireless device is controlled such that self-interference due to a Physical Uplink Shared Channel (PUSCH) transmission by the wireless device is mitigated.

In another embodiment, the cellular communications network is an LTE cellular communications network, and PUSCH hopping for a PUSCH transmission by the wireless device is controlled such that self-interference due to the PUSCH transmission by the wireless device is mitigated.

In another embodiment, the cellular communications network is an LTE cellular communications network, and Physical Downlink Shared Channel (PDSCH) resource allocation for the wireless device is controlled such that self-interference to PDSCH reception due to an uplink transmission by the wireless device is mitigated.

In another embodiment, the cellular communications network is an LTE cellular communications network, and PDSCH transmission to the wireless device is adapted such that self-interference to PDSCH reception due to an uplink transmission by the wireless device is mitigated.

In another embodiment, the cellular communications network is an LTE cellular communications network, and Physical Downlink Control Channel (PDCCH) resource allocation for the wireless device is controlled such that self-interference to PDCCH reception due to an uplink transmission by the wireless device is mitigated.

In another embodiment, the cellular communications network is an LTE cellular communications network, and PDCCH transmission to the wireless device is adapted such that self-interference to PDCCH reception due to an uplink transmission by the wireless device is mitigated.

In another embodiment, the cellular communications network is an LTE cellular communications network, and downlink reception by the wireless device is controlled such that the wireless device does not perform downlink reception during a subframe in which the self-interference is present and, in one preferred embodiment, in which the self-interference is strong.

In another embodiment, the cellular communications network is an LTE cellular communications network, and uplink transmission by the wireless device is controlled such that the wireless device does not transmit PUCCH during a subframe in which a PUCCH transmission would result in self-interference and, in one preferred embodiment, strong self-interference.

In another embodiment, the cellular communications network is an LTE cellular communications network, and uplink transmission by the wireless device is controlled such that the wireless device transmits only one of two or more frequency hops of a PUCCH transmission during a subframe in which the PUCCH transmission results in self-interference. In another embodiment, the cellular communications network is an LTE cellular communications network, and uplink transmission by the wireless device is controlled such that the wireless device transmits only one of two or more frequency hops of a PUCCH transmission during a subframe in which transmission of all of the frequency hops of the PUCCH transmission would result in strong self-interference.

In another embodiment, the cellular communications network is an LTE cellular communications network, and uplink transmission by the wireless device is controlled such that the wireless device transmits a PUCCH transmission with compress feedback information during a subframe in which a PUCCH transmission with non-compressed feedback information would result in self-interference.

In one embodiment, the one or more self-interference parameters include a frequency location of the self-interference and a strength of the self-interference. If the strength of the self-interference is greater than a threshold, the network node controls uplink transmission by the wireless device, downlink reception by the wireless device, and/or downlink reception by the wireless device in such a manner that the self-interference at the wireless device is mitigated.

In one embodiment, the network node is the wireless device. In another embodiment, the network node is a base station serving the wireless device in the cellular communications network.

In one embodiment, the self-interference is an expected self-interference that would result from an uplink transmission by the wireless device using specific uplink frequency resources in an uplink frequency band. In another embodiment, the self-interference is an actual self-interference resulting from an uplink transmission by the wireless device using specific uplink frequency resources in an uplink frequency band.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
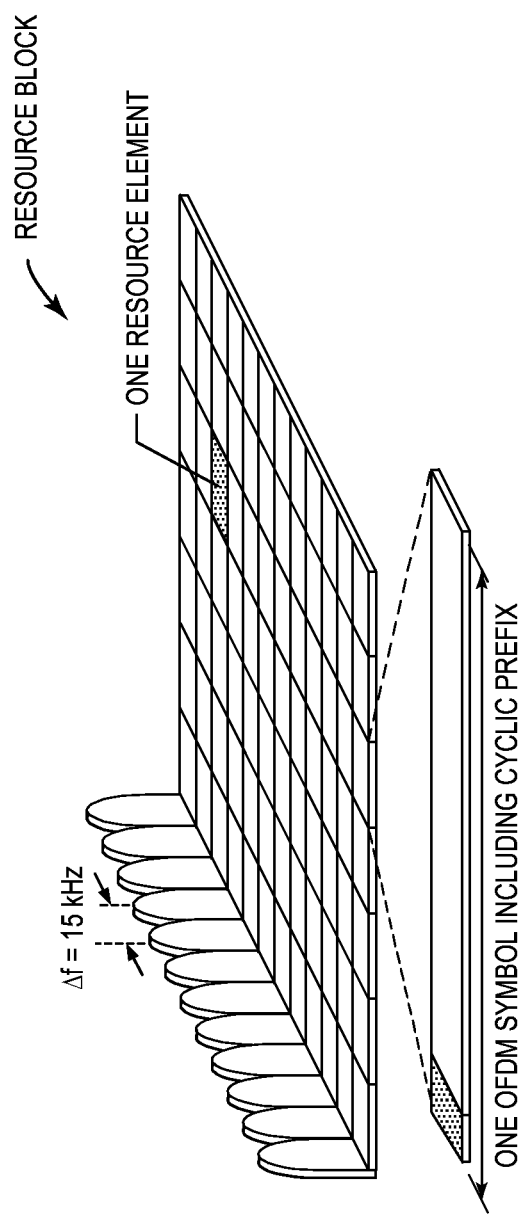
FIG. 1 illustrates a resource block in a Long Term Evolution (LTE) downlink carrier.
Figure 2:
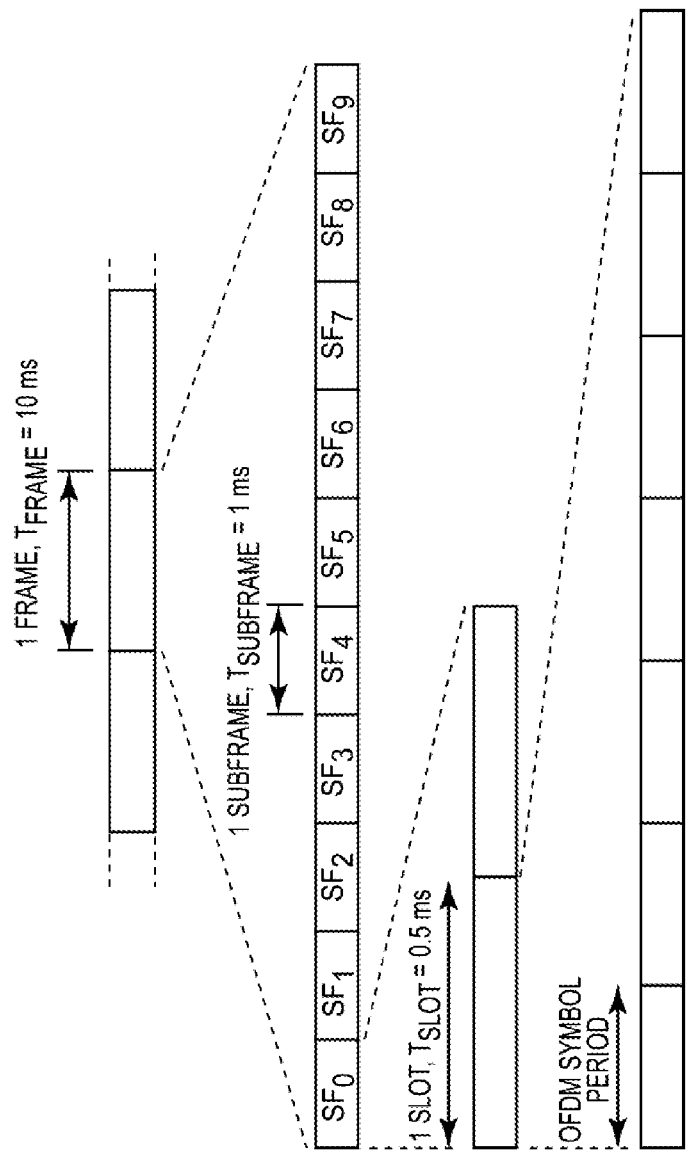
FIG. 2 illustrates a frame structure of an LTE downlink carrier.

Systems and methods for mitigating self-interference at a wireless device in a cellular communications network are disclosed. However, before describing these systems and methods, a discussion of 3rd Generation Partnership Project (3GPP) Long Term Evolution (LTE) as well as the issue of self-interference is beneficial. LTE (which as used herein includes both LTE and LTE Advance) is a mobile broadband wireless technology in which transmissions from base stations, which are referred to as enhanced Node Bs (eNBs), to mobile stations, which are referred to as User Equipment devices (UEs) or Wireless Devices (WDs), are sent using Orthogonal Frequency Division Multiplexing (OFDM). Specifically, LTE uses OFDM in the downlink and Discrete Fourier Transform (DFT)-spread OFDM in the uplink. OFDM splits the transmitted signal into multiple parallel sub-carriers in frequency. The basic unit of transmission in LTE is a Resource Block (RB), which in its most common configuration consists of 12 subcarriers in the frequency domain and 7 OFDM symbols (or one slot) in the time domain as illustrated in FIG. 1. A unit of 1 sub-carrier frequency and 1 OFDM symbol is referred to as a Resource Element (RE), which is also illustrated in FIG. 1. Thus, an RB consists of 84 REs. As illustrated in FIG. 2, in the time domain, LTE downlink transmissions are organized into radio frames of 10 milliseconds (ms) each consisting of ten equally-sized subframes of 1 ms. Further, for normal downlink subframes, each subframe consists of two equally sized slots of 0.5 ms with each slot consisting of seven OFDM symbol periods.

An LTE subframe includes two slots in the time domain and a number of RB pairs in the frequency domain. An RB pair is the two RBs in a subframe that are adjacent in time. RBs are numbered in the frequency domain, starting with 0 from one end to the other end of the system bandwidth. The number of RB pairs in the frequency domain determines a system bandwidth of the downlink carrier. Currently, system bandwidths supported by LTE correspond to the use of 6, 15, 25, 50, 75, or 100 RB pairs for the bandwidths of 1.4, 3, 5, 10, 15, and 20 Megahertz (MHz), respectively.

Figure 3:
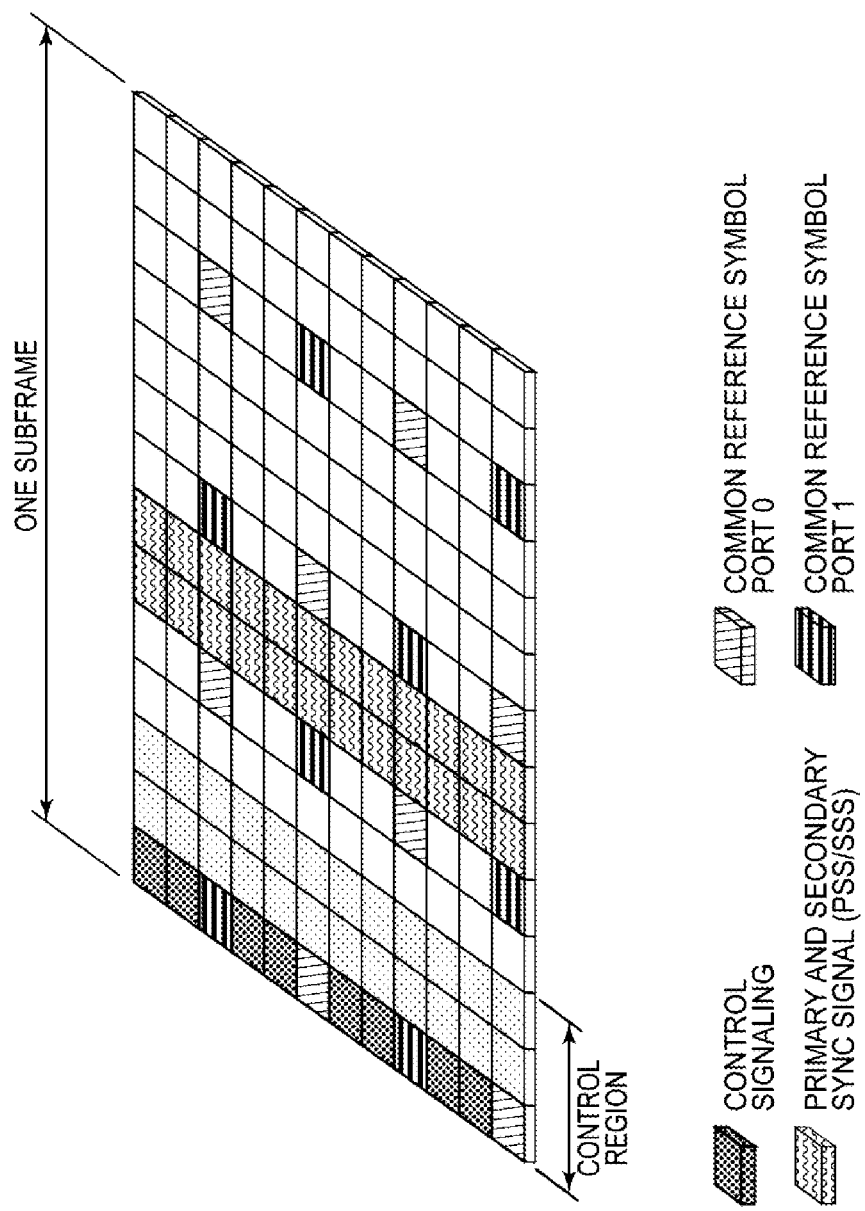
FIG. 3 illustrates an LTE subframe.

Downlink transmissions are dynamically scheduled. Specifically, in each downlink subframe, the base station transmits control information about to which UEs data is transmitted in the current subframe and upon which RBs the data is transmitted in the current downlink subframe. This control information, or control signaling, is typically transmitted in the first 1, 2, 3, or 4 OFDM symbols in each subframe and the number n=1, 2, 3, or 4 is known as a Control Format Indicator (CFI) indicated by a Physical CFI Channel (PCFICH) transmitted in the first symbol of the control region. The control region also contains Physical Downlink Control Channels (PDCCHs) and possibly also Physical Hybrid Automatic Repeat Request (HARQ) Indication Channels (PHICHs) carrying Acknowledgement/Non-acknowledgement (ACK/NACK) for uplink transmissions. The downlink subframe also contains Common Reference Symbols (CRSs), which are known to the receiver and are used for coherent demodulation of, for example, the control information. A downlink subframe with CFI=3 OFDM symbols is illustrated in FIG. 3.

A PDCCH is used to carry Downlink Control Information (DCI) such as scheduling decisions and power-control commands. More specifically, the DCI includes:

Downlink scheduling assignments, including Physical Downlink Shared Channel (PDSCH) resource indication, transport format, HARQ information, and control information related to spatial multiplexing (if applicable). A downlink scheduling assignment also includes a command for power control of a Physical Uplink Control Channel (PUCCH) used for transmission of HARQ acknowledgements in response to downlink scheduling assignments.

Uplink scheduling grants, including Physical Uplink Shared Channel (PUSCH) resource indication, transport format, and HARQ-related information. An uplink scheduling grant also includes a command for power control of the PUSCH.

Power-control commands for a set of UEs, or terminals, as a complement to the commands included in the scheduling assignments/grants.

One PDCCH carries one DCI message with one of the formats above. As multiple UEs can be scheduled simultaneously, on both downlink and uplink, there must be a possibility to transmit multiple scheduling messages within each subframe. Each scheduling message is transmitted on a separate PDCCH, and consequently there are typically multiple simultaneous PDCCH transmissions within each cell. Furthermore, to support different radio channel conditions, link adaptation can be used, where a code rate of the PDCCH is selected to match the radio channel conditions.

Figure 4:
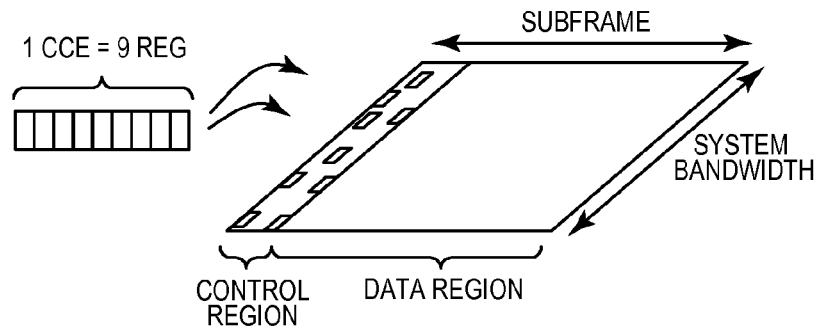
FIG. 4 illustrates mapping of one Control Channel Element (CCE) belonging to a Public Downlink Control Channel (PDCCH) to the control region within a downlink subframe in an LTE cellular communications network.

Control messages of PDCCH type are demodulated using CRS and transmitted in multiples of units called Control Channel Elements (CCEs) where each CCE contains 36 REs. A PDCCH may have an Aggregation Level (AL) of 1, 2, 4, or 8 CCEs to allow for link adaptation of the control message. Furthermore, as illustrated in FIG. 4, each CCE is mapped to 9 RE groups (REGs) consisting of 4 REs each. These REGs are distributed over the whole system bandwidth to provide frequency diversity for a CCE. Hence, the PDCCH, which consists of up to 8 CCEs, spans the entire system bandwidth in the first one to four OFDM symbols, depending on the configuration.

Figure 5:
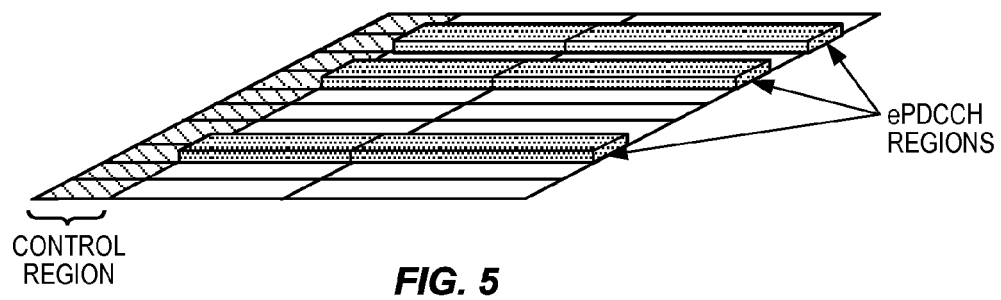
FIG. 5 illustrates enhanced control regions, or enhanced PDCCH (ePDCCH) regions, in a downlink subframe in an LTE cellular communications network.

As illustrated in FIG. 5, in LTE Release 11, an enhanced PDCCH (ePDCCH) was introduced in which Physical Resource Block (PRB) pairs are reserved to exclusively contain ePDCCH transmissions. However, the first one or four symbols are excluded from the PRB pairs because these symbols may contain control information to UEs of releases earlier than LTE Release 11. The remaining non-ePDCCH PRB pairs can be used for PDSCH transmissions. Hence, the ePDCCH is frequency multiplexed with PDSCH transmissions contrary to PDCCH which is time multiplexed with PDSCH transmissions. Note also that multiplexing of PDSCH and any ePDCCH transmission within a PRB pair is not supported in LTE Release 11.

The ePDCCH resources are UEs specifically configured in terms of ePDCCH sets. An ePDCCH set is a collection of N PRB pairs where the possible values of N are 2, 4, or 8. A UE can be configured with K=1 ePDCCH set or K=2 ePDCCH sets simultaneously, where the value N can be different for each of the 2 ePDCCH sets. Each ePDCCH set is also configured to be of either localized or distributed type. For example, a UE may be configured with K=2 ePDCCH sets and N1=4 and N2=8, where the first set is used for localized transmission and the second set is used for distributed transmission. The total number of blind decodes (32 in the case uplink Multiple-Input/Multiple-Output (MIMO) is not configured) is split between the K sets. The manner in which the total number of blind decodes is split among the sets is described in 3GPP specifications.

Uplink control signaling from a UE, or terminal, to a base station consists of:
  HARQ acknowledgements for received downlink data. Specifically, LTE uses HARQ, where, after receiving downlink data in a subframe, the UE attempts to decode the downlink data and reports to the base station whether the decoding was successful (ACK) or not (NACK). In case of an unsuccessful decoding attempt, the base station can retransmit the erroneous data.
  Terminal reports related to downlink channel conditions (Channel State Information (CSI) reports), used as assistance for the downlink scheduling. CSI consists of Channel Quality Indicator (CQI), Precoding Matrix Indicator (PMI), Precoding Type Indicator (PTI), and/or Rank Indication (RI)
  Scheduling requests indicating that a UE needs uplink resources for uplink data transmissions.

Figure 6:
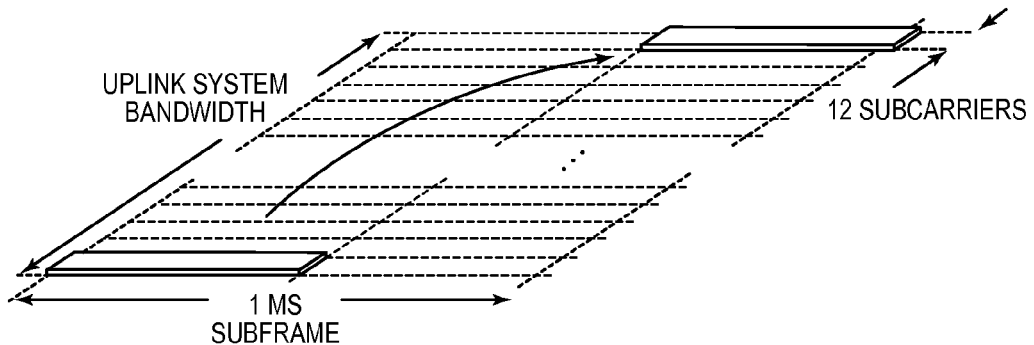
FIG. 6 illustrates an uplink L1/L2 control signaling transmission on an LTE Public Uplink Control Channel (PUCCH)

If a UE has not been assigned an uplink resource for data transmission, L1/L2 control information (i.e., HARQ acknowledgments, CSI reports, and scheduling requests) is transmitted in uplink resources (RBs) specifically assigned for uplink L1/L2 control on PUCCH. As illustrated in FIG. 6, the PUCCH resources are located at the edges of the system bandwidth of the cell (i.e., at the outermost resources or edges of the total available bandwidth for the cell). Each such PUCCH resource consists of 12 subcarriers (i.e., one RB) within each of the two slots of an uplink subframe. In order to provide frequency diversity, the PUCCH resources are frequency hopping on the slot boundary (i.e., one PUCCH resource consists of 12 subcarriers at one end of the spectrum within the first slot of a subframe and an equally sized PUCCH resource at the opposite end of the spectrum during the second slot of the subframe or vice versa). If more PUCCH resources are needed for the uplink L1/L2 control signaling (e.g., in case of very large overall transmission bandwidth supporting a large number of users), additional RBs can be assigned next to the previously assigned RBs.

The reasons for locating the PUCCH resources at the edges of the overall available spectrum are twofold. First, together with the frequency hopping described above, this maximizes the frequency diversity experienced by the control signaling. Second, assigning uplink resources for the PUCCH at other positions within the spectrum (i.e., not at the edges) will fragment the uplink spectrum, making it impossible to assign very wide transmission bandwidths to a single wireless device and still retain the single-carrier property of the uplink transmission.

The bandwidth of one RB during one subframe is too large for the control signaling needs of a single UE. Therefore, to efficiently exploit the PUCCH resources, multiple UEs can share the same RB by some form of orthogonal spreading. Further, depending on what kind of feedback information is transmitted in the PUCCH, the PUCCH is classified into various formats as follows:
  PUCCH Format 1: Used for scheduling request transmissions.
  PUCCH Format 1a/1b: Used for the transmission of 1 ACK/NACK bit (1a) or 2 ACK/NACK bits (1b). In carrier aggregation, PUCCH Format 1a/1b can be used together with channel selection to increase the number of HARQ ACK/NACK bits that can be transported.
  PUCCH Format 2: Used for the transmission of CSI bits.
  PUCCH Format 2a/2b: Used for the transmission of CSI bits together with 1 ACK/NACK bit (2a) or 2 ACK/NACK bits (2b).
  PUCCH Format 3: Used in carrier aggregation and Time Division Duplexing (TDD) to transmit HARQ ACK/NACK bits from multiple cells and/or subframes. The payload capacity of PUCCH Format 3 is 11 bits with standard Reed-Muller encoding and 21 bits with dual Reed-Muller encoding.
  PUCCH Format 3a: In LTE Release 11, it has been proposed to use a similar format to transmit CSI reports together with multi-cell ACK/NACK resources or only multi-cell CSI reports.

Figure 7:
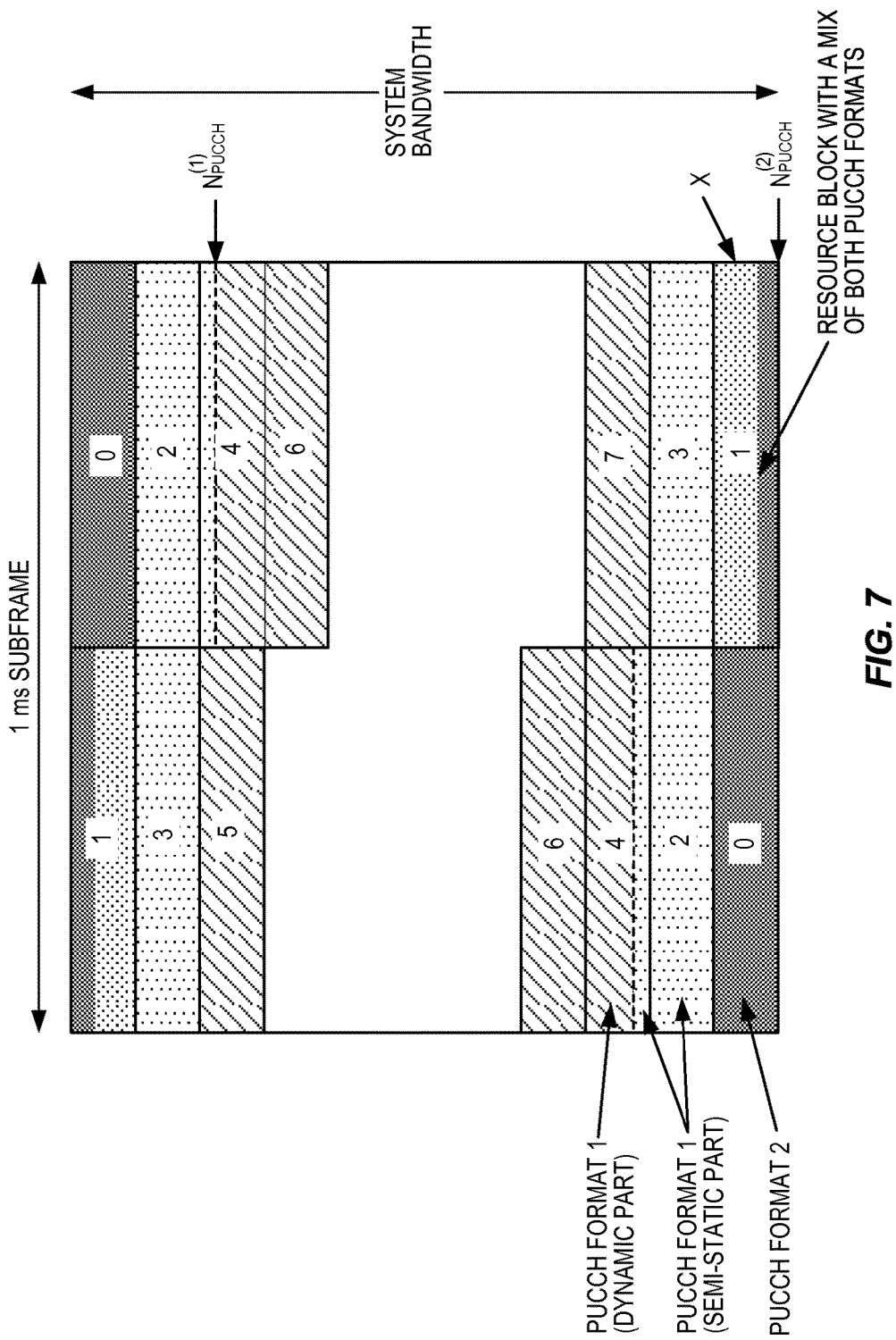
FIG. 7 illustrates a conventional allocation of resource blocks on the LTE PUCCH.

Multiple RB pairs can be used to increase the control signaling capacity. When one RB pair is full, the next PUCCH resource index is mapped to the next RB pair in sequence. As illustrated in FIG. 7, the mapping is in principle done such that PUCCH Format 2 (channel status reports) is transmitted closest to the edges of the uplink cell bandwidth with the semi-static part of PUCCH Format 1 next and finally the dynamic part of PUCCH Format 1 in the innermost part of the bandwidth. Three semi-statically defined parameters are used to determine the resources to use for the different PUCCH formats, namely: (1) $N_{RB}^{(2)}$, which is provided as part of the system information, controls the RB pair on which the mapping of PUCCH Format 1 begins, (2) $N_{PUCCH}^{(1)}$ controls the split between the semi-static and the dynamic part of PUCCH Format 1, and (3) X controls the mix of PUCCH Format 1 and PUCCH Format 2 in one RB. In most cases, the configuration is done such that the two PUCCH formats are mapped to separate sets of RBs, but there is also a possibility to have the border between PUCCH Format 1 and PUCCH Format 2 within a single RB. The PUCCH resource allocation in terms of RBs are illustrated in FIG. 7. The numbers 0, 1, 2, etc. represent the order in which the RBs are allocated to PUCCH, i.e., a large PUCCH configuration may need resources 0-6 while a small configuration may use only 0.

Figure 8:
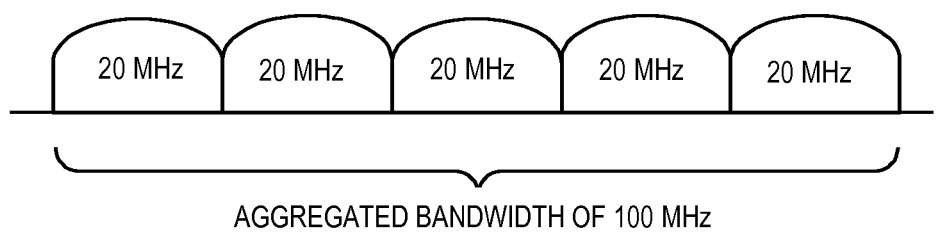
FIG. 8 illustrates Carrier Aggregation (CA) for LTE.

Thus far, the discussion has focused on a single carrier bandwidth. Starting in LTE Release 10, LTE supports bandwidths larger than 20 MHz. In order to assure backward compatibility with LTE Release 8 which supports a single bandwidth up to 20 MHz, starting with LTE Release 10, a carrier having a bandwidth that is larger than 20 MHz appears as a number of LTE carriers to an LTE Release 8 terminal using Carrier Aggregation (CA). Each such LTE carrier is referred to as a Component Carrier (CC). CA implies that an LTE Release 10 UE can receive multiple CCs, where each CC has, or at least has the possibility to have, the same structure as an LTE Release 8 carrier. CA is illustrated in FIG. 8.

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs in the downlink and uplink is different. It is important to note that the number of CCs configured in a cell may be different from the number of CCs seen by a UE. A UE may, for example, support more downlink CCs than uplink CCs, even though the cell is configured with the same number of uplink and downlink CCs.

During initial access, an LTE Release 10 UE behaves similar to an LTE Release 8 UE. Upon successful connection to the network, a UE may, depending on its own capabilities and the network, be configured with additional CCs in the uplink and the downlink. Configuration is based on Radio Resource Configuration (RRC). Due to the heavy signaling and rather slow speed of RRC signaling, it is envisioned that a UE may be configured with multiple CCs even though not all of them are currently used. If a UE is configured on multiple CCs, this would imply that the UE has to monitor all DL CCs for PDCCH and PDSCH. This implies a wider receiver bandwidth, higher sampling rates, etc. resulting in high power consumption.

To mitigate these problems, LTE Release 10 supports activation of CCs on top of configuration. The UE monitors only configured and activated CCs for PDCCH and PDSCH. Since activation is based on Medium Access Control (MAC) control elements, which are faster than RRC signaling, activation/de-activation can follow the number of CCs that are required to fulfill the current data rate needs. Upon arrival of large amounts of data, multiple CCs are activated, used for data transmission, and de-activated if no longer needed. All but one CC, which is referred to as a Downlink Primary CC (DL PCC), can be deactivated. Therefore, activation provides the possibility to configure multiple CCs but only activate them on an as-needed basis. Most of the time a UE would have one or very few CCs activated resulting in a lower reception bandwidth and thus battery consumption.

Scheduling of a CC is done on the PDCCH via downlink assignments. As discussed above, control information on the PDCCH is formatted as a DCI message. In LTE Release 8, a UE only operates with one DL and one UL CC and, therefore, the association between downlink assignment, uplink grants, and the corresponding DL and UL CCs is clear. In LTE Release 10, two modes of CA scheduling are supported. In the first CA scheduling mode, which is referred to as self-scheduling, scheduling is very similar to the operation of multiple LTE Release 8 UEs. In particular, a downlink assignment or uplink grant contained in a DCI message transmitted on a CC is either valid for the DL CC itself or for the associated UL CC. In the second CA scheduling mode, which is referred to as cross-carrier scheduling, the DCI message is augmented with a Carrier Indicator Field (CIF), which is a CC index pointer. A DCI containing a downlink assignment with a CIF is valid for the DL CC indicted by CIF, and a DCI containing an uplink grant with a CIF is valid for the UL CC indicated by the CIF.

In LTE Release 10, the transmission of PUCCH is mapped onto one specific uplink CC, an Uplink Primary CC (UL PCC). UEs configured with only a single DL CC, which is then the DL PCC, and a single UL CC, which is then the UL PCC, utilize dynamic ACK/NACK on PUCCH according to LTE Release 8. The first CCE used to transmit PDCCH for the downlink assignment determines the dynamic ACK/NACK resource on PUCCH for LTE Release 8. Since only one DL CC is cell-specifically linked with the UL PCC, no PUCCH collisions can occur since all PDCCHs are transmitted using a different first CCE.

Upon reception of downlink assignments on a single Secondary CC (SCC) or reception of multiple downlink assignments, PUCCH carrying multi-cell HARQ-ACK should be used. A DL SCC assignment alone is not typical. The scheduler at the eNB should strive to schedule a single DL CC assignment on the DL PCC and try to deactivate SCCs if not needed. A possible scenario that may occur is that eNB schedules a UE on multiple DL CCs including the DL PCC. If the UE misses all but the DL PCC assignment, the UE will use LTE Release 8 PUCCH instead of PUCCH carrying multi-cell HARQ-ACK. To detect this error case, the eNB has to monitor both the LTE Release 8 PUCCH and the PUCCH carrying multi-cell HARQ-ACK.

Figure 9:
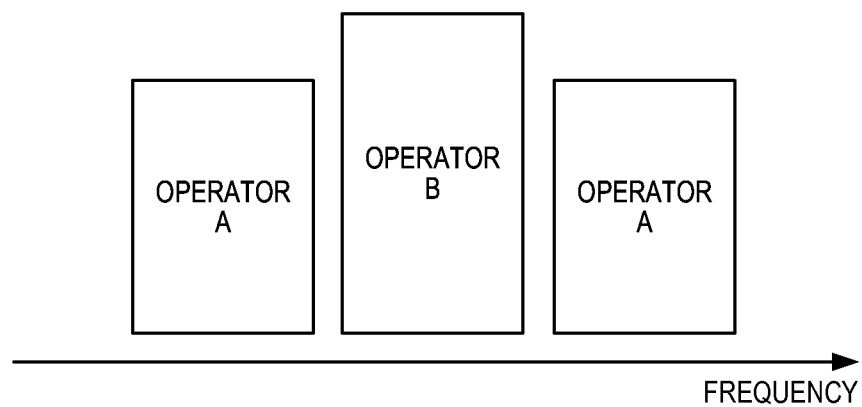
FIG. 9 illustrates non-contiguous intra-band CA.

In LTE Release 11, a new type of CA is introduced. As illustrated in FIG. 9, component carriers located in the same frequency band but occupying non-contiguous frequencies can be aggregated. This is referred to as non-contiguous intra-band CA. In non-contiguous intra-band CA, there is a gap between two carriers owned by one operator. The frequency spectrum in the gap is owned by another operator and is deployed in an uncoordinated way relative to first operator.

CA, including non-contiguous intra-band CA, supports simultaneous transmission and reception of multiple CCs at a UE. This poses serious design challenges in the radio subsystems of the UEs. One such design challenge is UE self-interference, which includes leakage of the uplink carrier(s) into the downlink carrier(s).

Figure 10:
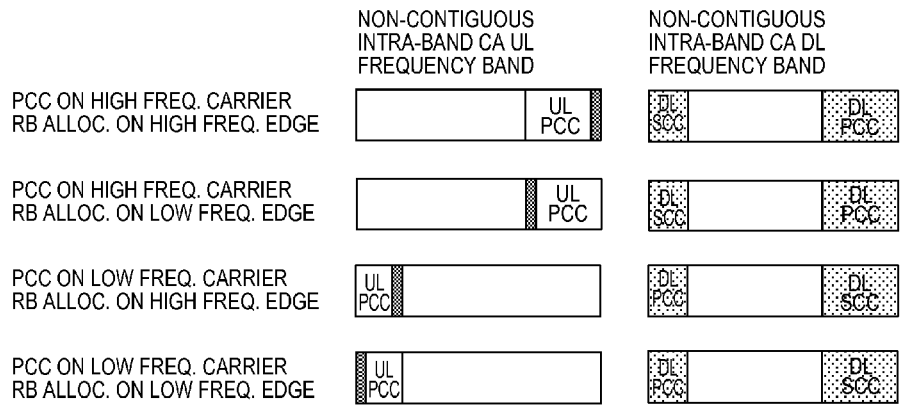
FIG. 10 illustrates a number of different CA configurations and uplink resource allocations.
Figure 11:
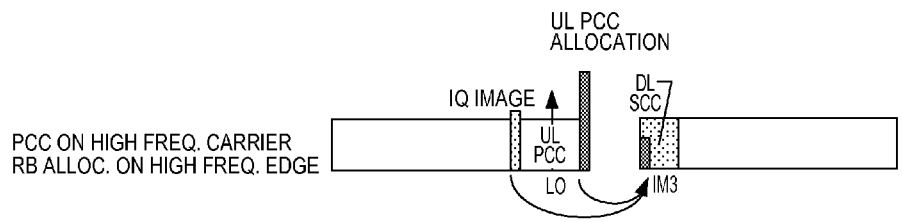
FIG. 11 illustrates one example of self-interference at a User Equipment (UE) resulting from Third-Order Intermodulation (IM3)
Figure 12:
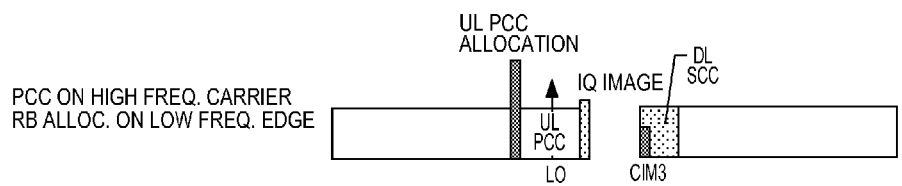
FIG. 12 illustrates one example of self-interference at a UE resulting from Counter IM3 (CIM3)

Assuming non-contiguous intra-band CA, FIG. 10 illustrates different CA configurations and uplink resource allocations. Specifically, FIG. 10 illustrates a non-contiguous intra-band CA uplink frequency band and a non-contiguous intra-band CA downlink frequency band. In each CA configuration, the UE is configured with a UL PCC, a DL SCC, and a DL PCC, which in this example are also activated. In the first two CA configurations illustrated in FIG. 10, a highest frequency CC of the CA uplink frequency band is configured as the UL PCC. FDD DL and UL carrier frequencies have a fixed duplex distance as shown in FIG. 10 for the DL PCC and the UL PCC. This distance is larger than the distance between the DL SCC and the UL PCC. As a result, the UL PCC is closer to the DL SCC than in LTE Release 8 and thus creates more self-interference. In particular, in the first CA configuration, the UE is allocated an uplink resource at an edge of the UL PCC frequency band that is closest to the DL SCC. As a result, an uplink transmission by the UE using that uplink resource and an In-Phase and Quadrature (IQ) image of the uplink transmission create a Third-Order Intermodulation (IM3) component in a frequency band of the DL SCC, as illustrated in FIG. 11. Conversely, in the second CA configuration illustrated in FIG. 10, the UE is allocated an uplink resource at an edge of the frequency band of the UL PCC that is furthest from the DL SCC. As illustrated in FIG. 12, even when the uplink resource is allocated around edge of the UL PCC frequency band furthest from the DL SCC, an uplink transmission by the UE using this uplink resource creates a Counter IM3 (CIM3) component in the DL SCC frequency band. The CIM3 component is at the same frequency as the IM3 component in FIG. 11 but is about 20 Decibels (dB) weaker.

The third and fourth CA configurations illustrated in FIG. 10, a lowest frequency CC of the CA uplink frequency band is configured as the UL PCC. In this example, this lowest frequency CC is the furthest CC from the DL SCC. As a result, uplink transmissions by the UE in this UL PCC result in weak or no self-interference in the frequency band for the DL SCC.

As long as the LTE air interface is concerned, uplink transmissions may occur at or near the edges of the frequency band for the UL CCs. For example, a UE may transmit PUSCH at or near the edge of the UL PCC, depending on the uplink scheduling grant. In addition, as discussed above, the PUCCH transmission (particularly PUCCH Format 2), if any, occurs at the edge of the frequency band of the UL PCC together with frequency hopping. The impact of the PUCCH transmission on PDSCH reception at the UE depends on the downlink scheduling assignment, since the self-interference may hit only a small fraction of the frequency band of the DL SCC. However, the PUCCH transmission is likely to cause self-interference to PDCCH reception at the UE since the PDCCH generally spans the whole bandwidth of the DL SCC. As such, there is a need for systems and methods for mitigating such self-interference.

Figure 13:
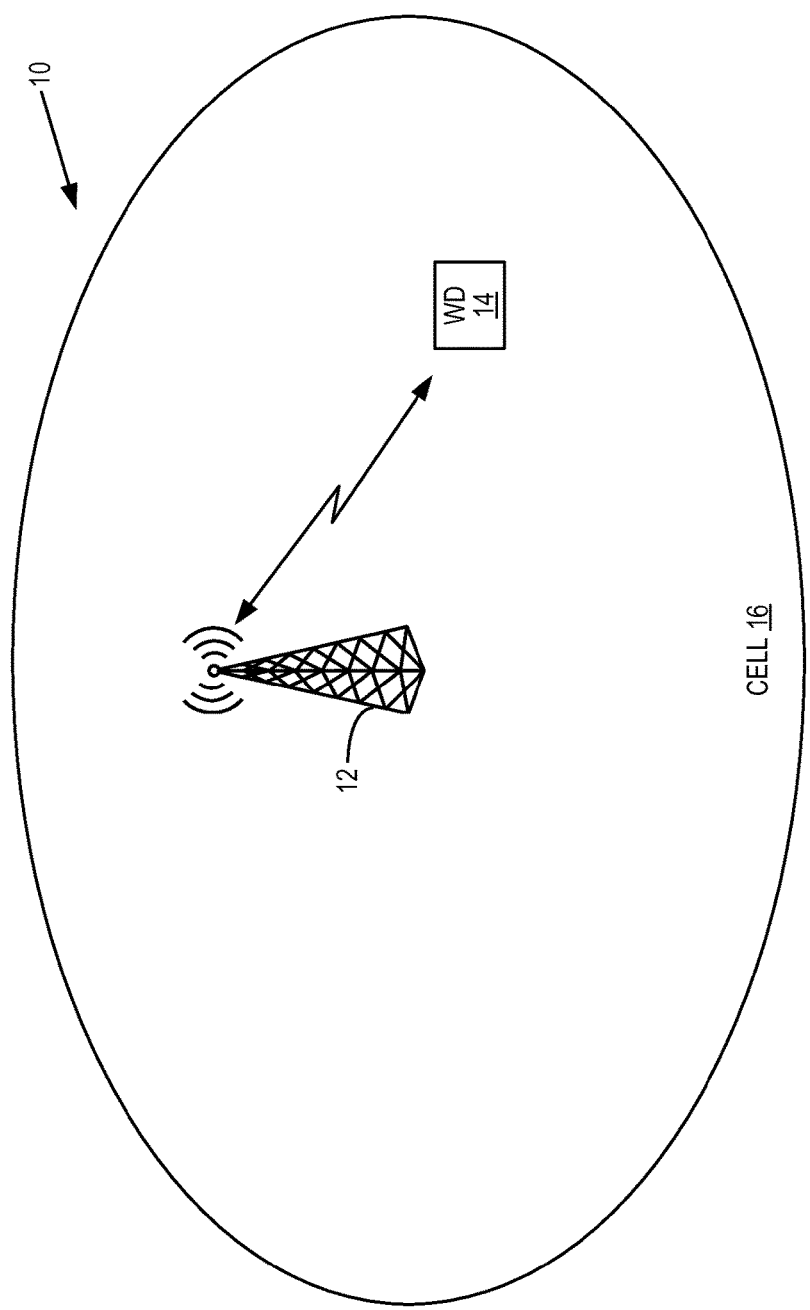
FIG. 13 illustrates a cell of a cellular communications network in which a base station and/or a wireless device (e.g., a UE) served by the base station operate to mitigate self-interference at the wireless device according to one embodiment of the present disclosure.

In this regard, FIG. 13 illustrates a cellular communications network 10 in which self-interference is mitigated according to one embodiment of the present disclosure. As illustrated, the cellular communications network 10 includes a base station 12 and a wireless device 14 within a cell 16 served by the base station 12. In FIG. 1, only one base station 12 and one wireless device 14 are illustrated for clarity and ease of discussion. However, the cellular communications network 10 typically will include many base stations 12 and many wireless devices 14. The cellular communications network 10 is preferably an LTE cellular communications network and, as such, LTE terminology is sometimes used herein. However, the concepts disclosed herein are not limited to LTE and may be used in any suitable type of cellular communications network. Further, as used herein, the term "LTE" encompasses both LTE and LTE Advanced.

Figure 14:
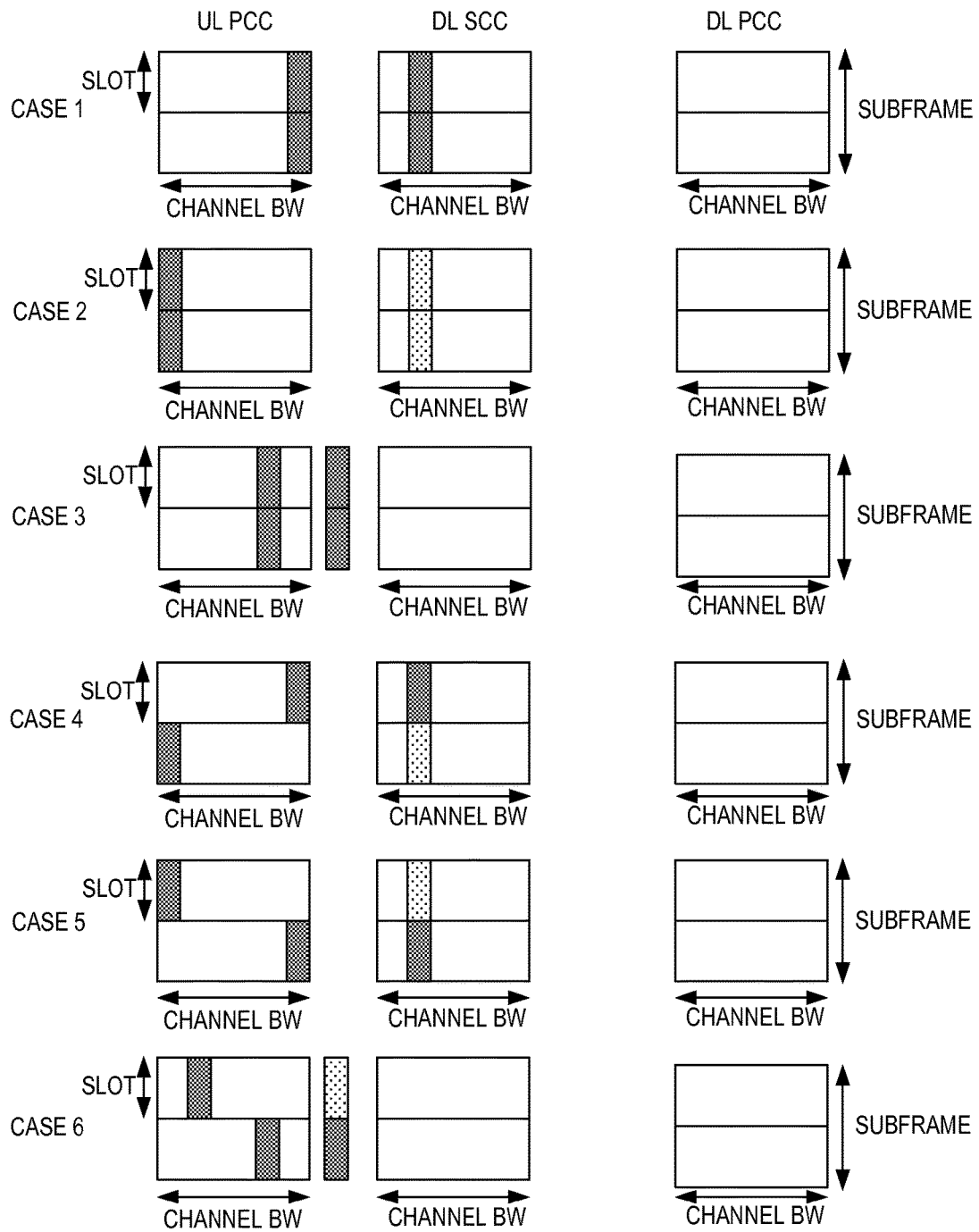
FIG. 14 illustrates self-interference for different uplink transmissions without and with frequency hopping.

As discussed below in detail, a network node (e.g., the base station 12 or the wireless device 14) operates to mitigate self-interference at the wireless device 14 resulting from an uplink transmission by the wireless device 14. As used herein, mitigating self-interference refers to avoiding or otherwise decreasing the impact of self-interference. In the preferred embodiments described herein, uplink and downlink non-contiguous CA are utilized, where the wireless device 14 is configured with one or more UL CCs, including a UL PCC, and one or more, and preferably two or more, DL CCs (e.g., a DL PCC and a DL SCC). However, before discussing specific embodiments of the present disclosure for mitigating self-interference, a discussion of several scenarios of self-interference is beneficial. In this regard, FIG. 14 illustrates six different cases of self-interference resulting from an uplink transmission by the wireless device 14 on the UL PCC. In particular, FIG. 14 illustrates uplink resources allocated for uplink transmission by the wireless device 14 within an uplink subframe on the UL PCC and frequency locations of resulting self-interference signals in relation to the DL SCC for a corresponding downlink subframe for six different cases.

In Case 1, the wireless device 14 transmits an uplink transmission (e.g., a PUCCH transmission or a PUSCH transmission) at an edge of a frequency band of a UL PCC of the wireless device 14 that is closest to the DL SCC of the wireless device 14. The uplink resources at the edge of the frequency band of the UL PCC are also referred to herein as edge, or outermost, uplink resources. The frequency band of the UL PCC has a corresponding bandwidth, which is referred to herein as a channel Bandwidth (BW) of the UL PCC. As such, the edge of the frequency band of the UL PCC is also referred to herein as a channel edge of the UL PCC. As a result of the uplink transmission at the edge of the UL PCC, a self-interference signal falls within a frequency band or channel bandwidth of the DL SCC of the wireless device 14. More specifically, in this embodiment, the self-interference signal is an IM3 component located at an IM3 frequency of the uplink transmission and its IQ image. Specifically, if the uplink transmission is centered at a frequency $f_{UL}$ and the IQ image of the uplink transmission is located at a frequency $f_{IQ}$, then the IM3 component is centered on one of the IM3 frequencies of $2f_{UL}-f_{IQ}$ and $2f_{IQ}-f_{UL}$ that falls within the frequency band of the DL SCC.

In Case 2, the wireless device 14 transmits an uplink transmission (e.g., a PUCCH transmission or a PUSCH transmission) at an edge of the frequency band of the UL PCC of the wireless device 14 that is furthest from the DL SCC of the wireless device 14. As a result of the uplink transmission at the edge of the UL PCC, a self-interference signal falls within the frequency band or channel bandwidth of the DL SCC of the wireless device 14. In this embodiment, the self-interference signal is a CIM3 component located at a CIM3 frequency of the uplink transmission and its IQ image. Specifically, if the uplink transmission is centered at a frequency $f_{UL}$ and the IQ image of the uplink transmission is located at a frequency $f_{IQ}$, then the CIM3 component is centered on one of the CIM3 frequencies of $2f_{UL}-f_{IQ}$ and $2f_{IQ}-f_{UL}$ that falls within the frequency band of the DL SCC. However, the CIM3 component is weaker than the IM3 component in Case 1. In one particular implementation, the CIM3 component is about 20 dB weaker than the IM3 component.

In Case 3, the wireless device 14 transmits an uplink transmission (e.g., a PUCCH Format 1 transmission or a PUSCH transmission) away from the edges of the frequency band of the UL PCC. The uplink resources away from the edges of the frequency band of the UL PCC are referred to herein as inner uplink resources. As a result of the uplink transmission using the inner uplink resources, a self-interference signal falls outside of the frequency band or channel bandwidth of the DL SCC of the wireless device 14. Specifically, in Case 3, since the frequency difference between $f_{UL}$ and $f_{IQ}$ is relatively small, the IM3 (and CIM3) frequency nearest to the DL SCC falls in a gap between the frequency band for the UL PCC and the frequency band for the DL SCC. As such, the self-interference signal does not interfere with reception at the wireless device 14 on the DL SCC.

Cases 4-6 are similar to Cases 1-3 but where there is frequency hopping at the slot boundary within the uplink subframe. As such, in Case 4, the self-interference signal in the second slot corresponding to the CIM3 component is weaker than the self-interference signal in the first slot corresponding to the IM3 component. Likewise, in Case 5, the self-interference signal in the first slot corresponding to the CIM3 component is weaker than the self-interference signal in the second slot corresponding to the IM3 component. In Case 6, like in Case 3, the self-interference signal does not fall within the frequency band of the DL SCC.

Notably, in FIG. 14, it is assumed that the duplexer gap (i.e., the gap between the UL PCC and the DL SCC) is no larger than the PCC channel bandwidth. However, the concepts disclosed herein are not limited thereto. Rather, the concepts disclosed herein are applicable as long as the uplink transmission interferes with the downlink reception of the same UE. For example, the concepts disclosed herein may also be applicable to self-interfering signals resulting from Fifth-Order Intermodulation (IM5) or Counter IM5 (CIM5) falling within the downlink frequency band, even when the duplexer gap is larger than the PCC channel bandwidth.

Figure 15:
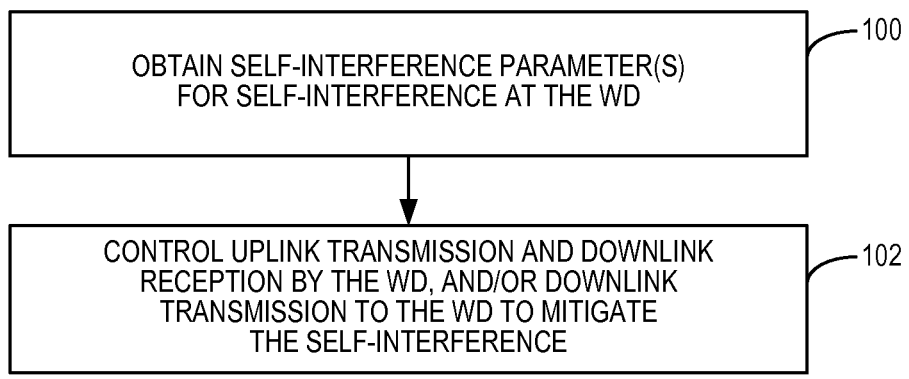
FIG. 15 illustrates a process for mitigating self-interference at the wireless device of FIG. 13 according to one embodiment of the present disclosure.

The systems and methods described herein operate to mitigate (e.g., avoid) self-interference particularly in Cases 1, 2, 4, and 5 of FIG. 14 by controlling uplink transmission and/or downlink reception by the wireless device 14. Note, however, that the cases illustrated in FIG. 14 are only examples and the systems and methods disclosed herein are not limited to mitigating self-interference in those cases. In this regard, FIG. 15 illustrates a process for mitigating self-interference according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 are obtained by the network node (step 100). In one embodiment, the network node obtains the one or more self-interference parameters by determining the one or more self-interference parameters at the network node. In another embodiment, the network node obtains the one or more self-interference parameters from another network node (e.g., the base station 12 obtains the one or more self-interference parameters from the wireless device 14 or vice versa).

Depending on the particular embodiment, the self-interference is either an expected self-interference that would result from a hypothesized uplink transmission by the wireless device 14 using a particular uplink resource (e.g., a particular PRB pair(s)) or an actual self-interference that results from an actual uplink transmission by the wireless device 14 using a particular uplink resource. The one or more self-interference parameters include a frequency location of the self-interference and/or a strength of the self-interference. Notably, in one preferred embodiment, the self-interference parameters include both the frequency location and the strength of the self-interference.

In one embodiment, the frequency location of the self-interference within a downlink frequency band (e.g., a frequency band of a DL SCC) of the wireless device 14 is determined based on a frequency location of the uplink transmission. Again, the uplink transmission may be a hypothesized uplink transmission resulting in expected self-interference or an actual uplink transmission resulting in actual self-interference. As discussed above, when considering IM3 and CIM3 as the self-interference, the frequency location of the self-interference is determined by first determining the center frequencies of the IM3 and CIM3 components as $2f_{UL}-f_{IQ}$ and $2f_{IQ}-f_{UL}$, where $f_{UL}$ and $f_{IQ}$ are known from the uplink resource for the uplink transmission. The center frequency of the IM3 or CIM3 that is within or closest to a downlink frequency band of the wireless device 14 (e.g., a DL SCC of the wireless device 14) is a center frequency $f_{SI}$ of the self-interference. A bandwidth of the self-interference is typically 2-3 times larger than that of the uplink transmission. Thus, the frequency location of the self-interference is determined to be $f_{SI} \pm BW_{SI}/2$, where $BW_{SI}$ is a bandwidth of the self-interference. Note that while IM3 and CIM3 are considered in this example, higher order intermodulation products (e.g., IM5) and/or higher order counter-intermodulation products (e.g., CIM5) may also be considered.

It should be noted that the frequency location of the self-interference may be computed from the network node or some other network node from which the network node obtains the one or more self-interference parameters. However, in an alternative embodiment, the frequency location of the self-interference may otherwise be determined. For example, a Look-Up Table (LUT) or similar mechanism may be used to determine the frequency location of the self-interference for different uplink resources.

Regarding the strength of the self-interference, in one embodiment, the strength of the self-interference is determined based on a strength of the uplink transmission. The wireless device 14 knows the strength of the uplink transmission. The base station 12 can obtain the strength of the uplink transmission based on, for example, a Power Headroom Report (PHR) from the wireless device 14. More specifically, in LTE, the wireless device 14 can be configured by the base station 12 to provide a PHR to the base station 12. The base station 12 can adjust the uplink transmission power by the wireless device 14 by transmitting power control commands to the wireless device 14. Using the PHR and the power control commands, the base station 12 can estimate the strength, or power, of the uplink transmission.

Once the strength of the uplink transmission is known, the network node determines the strength of the self-interference based on the strength of the uplink transmission. In one embodiment, if the self-interference is the IM3 component of the uplink transmission, the strength of the self-interference ($P_{SI}$) is given by:

$$P_{SI}(dB)=P_{IM3}(dB)=2P_{UL}+P_{IQ}-2OIP3,$$

where $P_{IM3}$ is a strength or power of the IM3 component, $P_{UL}$ is the strength or power of the uplink transmission, $P_{IQ}$ is a strength or power of the IQ image of the uplink transmission, and OIP3 is the Third-Order Output Intercept Power of a power amplifier of wireless device 14. Similarly, if the self-interference is the CIM3 component of the uplink transmission, the strength of the self-interference ($P_{SI}$) is given by:

$$P_{SI}(dB)=P_{CIM3}(dB)=P_{UL}+CIM3,$$

where CIM3 is the counter IM3 of transmitter circuitry (e.g., a transmitter Application Specific Integrated Circuit (ASIC)) of the wireless device 14. Notably, additional information may be used by the network node to more accurately estimate the strength of the self-interference. This additional information may include, for example, duplexer isolation at the wireless device 14 and radio impairments at the wireless device 14 (e.g., image rejection ratio and non-linearity of the receiver of the wireless device 14). Notably, the strength of the self-interference may vary from one slot to another within the same subframe, as illustrated above in Cases 4 and 5 in FIG. 14.

As an example, in Case 4, let us assume that the base station 12 knows that the uplink transmit power at the wireless device 14 is set to 23 Decibel-Milliwatt (dBm) based on the PHR from the wireless device 14. Assuming 50 Decibels relative to the carrier (dBc) duplexer isolation between the transmitter and the receiver of the wireless device 14 and 2 dB duplexer loss from the transmitter port to the antenna port at the wireless device 14, the base station 12 can determine that the strength of the uplink transmit signal at the receiver port of the duplexer at the wireless device 14 is −25 dBm. In addition, let us assume that the base station 12 also knows that the transmitter ASIC of the wireless device 14 has CIM3 of −60 dBc and an image rejection ratio of −25 dBc and that the power amplifier of the wireless device 14 has OIP3 of 30.5 dBm. Then, the base station 14 can determine that the strength of the self-interference in the first slot is −65 dBm, whereas the strength of the self-interference in the second slot is −85 dBm (i.e., 60 dB below the uplink transmission). Of course, the base station 12 may not make some assumptions on such information as duplexer isolation, CIM3, image rejection ratio, OIP3, etc. and simply rely on the PHR from the wireless device 14 and knowledge of the power control commands sent to the wireless device 14 to determine the strength of the self-interference.

Once the one or more self-interference parameters are determined, the network node controls uplink transmission by the wireless device 14, downlink reception by the wireless device 14, and/or downlink transmission to the wireless device 14 from the base station 12 such that the self-interference is mitigated (step 102). As discussed below, the manner in which uplink transmission, downlink reception, and/or downlink transmission is controlled varies depending on the particular embodiment. In one embodiment, uplink resource allocation is controlled such that the self-interference is mitigated. In another embodiment, uplink transmission is controlled, or adapted, such that the self-interference is mitigated. In another embodiment, downlink resource allocation is controlled such that the self-interference is mitigated. In another embodiment, downlink transmission by the base station 12 and/or downlink reception by the wireless device 14 is controlled, or adapted, such that the self-interference is mitigated.

FIGS. 16 through 33 illustrate various embodiments for mitigating self-interference. In the description of these embodiments, references are made to the UL PCC and the DL SCC of the wireless device 14 as being the uplink carrier on which uplink transmission is transmitted by the wireless device 14 and the downlink carrier on which the self-interference is present. However, the concepts disclosed herein are not limited to the UL PCC and the DL SCC but are rather more generally applicable to any uplink carrier of the wireless device 14 and any downlink carrier of the wireless device 14 to which uplink transmissions by the wireless device 14 on the uplink carrier can result in self-interference on the downlink carrier.

Figure 16:
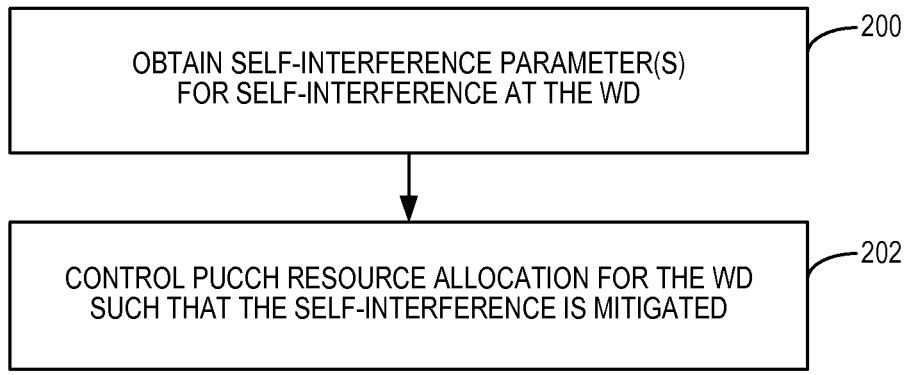
FIG. 16 illustrates a process for mitigating self-interference at the wireless device of FIG. 13 by controlling PUCCH resource allocation according to one embodiment of the present disclosure.

FIG. 16 illustrates a process for mitigating self-interference by controlling PUCCH resource allocation according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 resulting from a hypothesized or actual uplink transmission by the wireless device 14 on the UL PCC using an edge PUCCH resource are obtained (step 200). The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the edge PUCCH resource is present in the frequency band of the DL SCC of the wireless device 14 (i.e., the frequency location of the self-interference is in or overlaps the downlink frequency band of the DL SCC). As such, the network node controls PUCCH resource allocation for the wireless device 14 such that the self-interference is mitigated (step 202). In one embodiment, PUCCH resource allocation is controlled only if the strength of the self-interference is strong. In another embodiment, PUCCH resource allocation is controlled based on the strength of the self-interference. PUCCH resource allocation is controlled such that PUCCH transmission by the wireless device 14 is assigned to inner PUCCH resources, which are located away from the edge of the UL PCC channel. As a result, as discussed above with respect to Case 3 and Case 6 of FIG. 14, the resulting self-interference from PUCCH transmission(s) by the wireless device 14 using the inner PUCCH resources falls outside of the downlink frequency band of the DL SCC and, as such, self-interference is mitigated.

Figure 17:
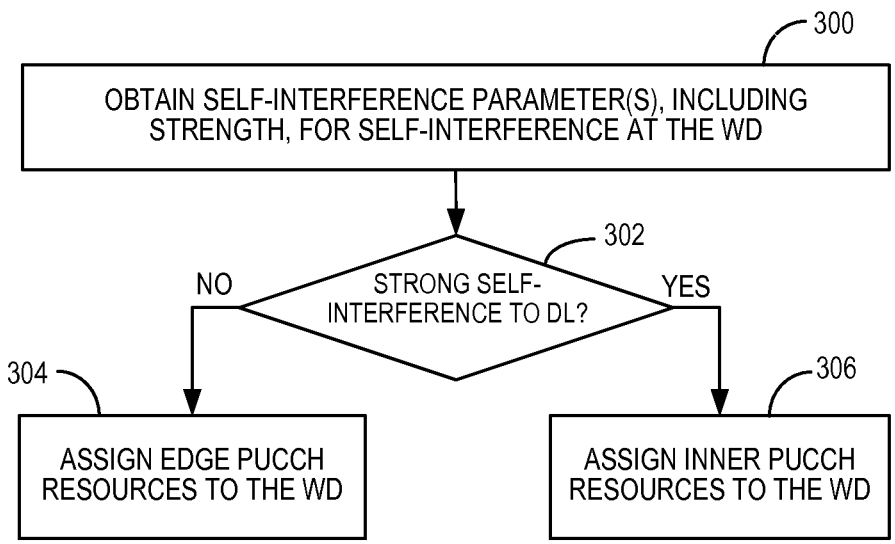
FIG. 17 illustrates a process for mitigating self-interference at the wireless device of FIG. 13 by controlling PUCCH resource allocation based on a strength of the self-interference according to one embodiment of the present disclosure.

FIG. 17 illustrates a process for mitigating self-interference by controlling PUCCH resource allocation according to another embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters, including strength, for self-interference at the wireless device 14 resulting from a hypothesized or actual uplink transmission by the wireless device 14 on the UL PCC using an edge PUCCH resource are obtained (step 300). The one or more self-interference parameters may further include a frequency location of the self-interference.

The network nodes then determines whether the hypothesized or actual uplink transmission by the wireless device 14 using the edge PUCCH resource results in strong self-interference in the frequency band of the DL SCC of the wireless device 14 (step 302). More specifically, the network node determines whether the frequency location of the self-interference resulting from the hypothesized or actual uplink transmission using the edge PUCCH resource is within or overlaps the downlink frequency band of the DL SCC and, if so, whether the strength of the self-interference is greater than a defined threshold indicative of strong self-interference. In one embodiment, the threshold for strong self-interference is represented as a signal-to-(self)-interference ratio, which is a ratio of a downlink received signal power at the wireless device 14 to the strength of the self-interference. The strength of the self-interference is then greater than the defined threshold if the signal-to-(self)-interference ratio is less than a defined signal-to-(self)- interference threshold. Note that the received signal power in the DL SCC channel can be estimated by the base station 12 based on a Reference Signal Received Power (RSRP) report that is sent from the wireless device 14 to the base station 12.

If the self-interference resulting from the hypothesized or actual uplink transmission using the edge PUCCH resource is either not in or overlapping the downlink frequency band or not strong, edge PUCCH resources are assigned to PUCCH transmissions by the wireless device 14 (step 304). Otherwise, if the self-interference is in or overlaps the downlink frequency band and is strong, inner PUCCH resources are assigned to PUCCH transmissions by the wireless device 14 (step 306). The inner PUCCH resources are resources away from the edge of the uplink channel. By using inner PUCCH resources, the frequency location of the self-interference is moved away from the DL SCC, which in turn mitigates the self-interference.

Figure 18:
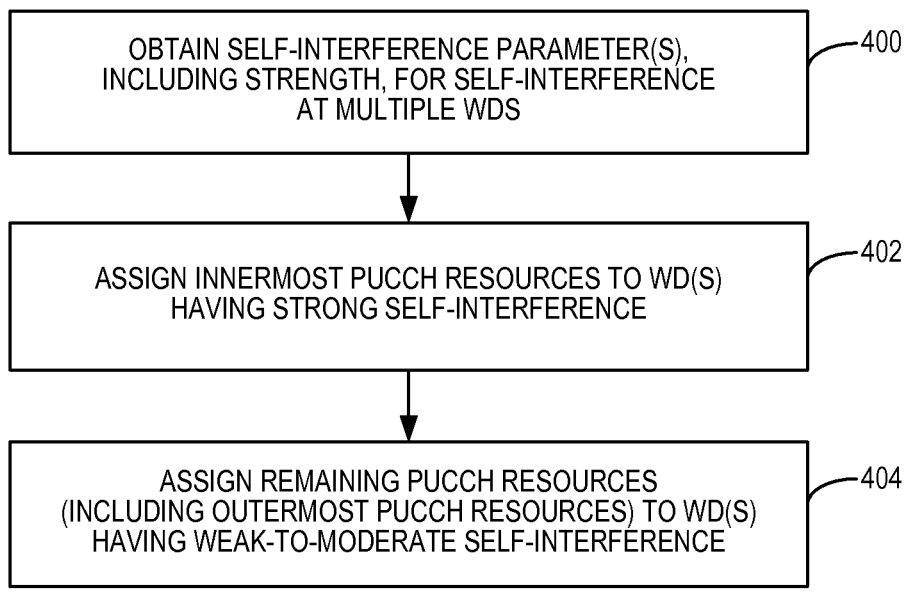
FIG. 18 illustrates a process for mitigating self-interference at a number of wireless devices by controlling PUCCH resource allocation such that wireless devices with strong self-interference are assigned inner PUCCH resources according to one embodiment of the present disclosure.

FIG. 18 illustrates a process for mitigating self-interference by controlling PUCCH resource allocation according to another embodiment of the present disclosure. This embodiment is similar to that of FIG. 17 but where PUCCH resource allocation is controlled for multiple wireless devices 14. This process is preferably performed by a network node (e.g., the base station 12) but may alternatively be performed by multiple network nodes (e.g., the base station 12 and the wireless device 14) in a distributed manner. First, one or more self-interference parameters, including strength, for self-interference at the wireless devices 14 resulting from hypothesized or actual uplink transmissions by the wireless devices 14 using edge PUCCH resources in the UL PCCs of the wireless device 14 are obtained (step 400). Notably, the wireless devices 14 may have the same UL PCC or different UL PCCs. Likewise, the wireless devices 14 may have the same DL SCC or different DL SCCs. The one or more self-interference parameters may further include frequency locations of the self-interference signals. The network node then assigns innermost PUCCH resources to the wireless devices 14 having strong self-interference (step 402) and assigns outermost, or edge, PUCCH resources to the wireless devices having weak-to-moderate self-interference (step 404). In this manner, self-interference is mitigated.

Figure 19:
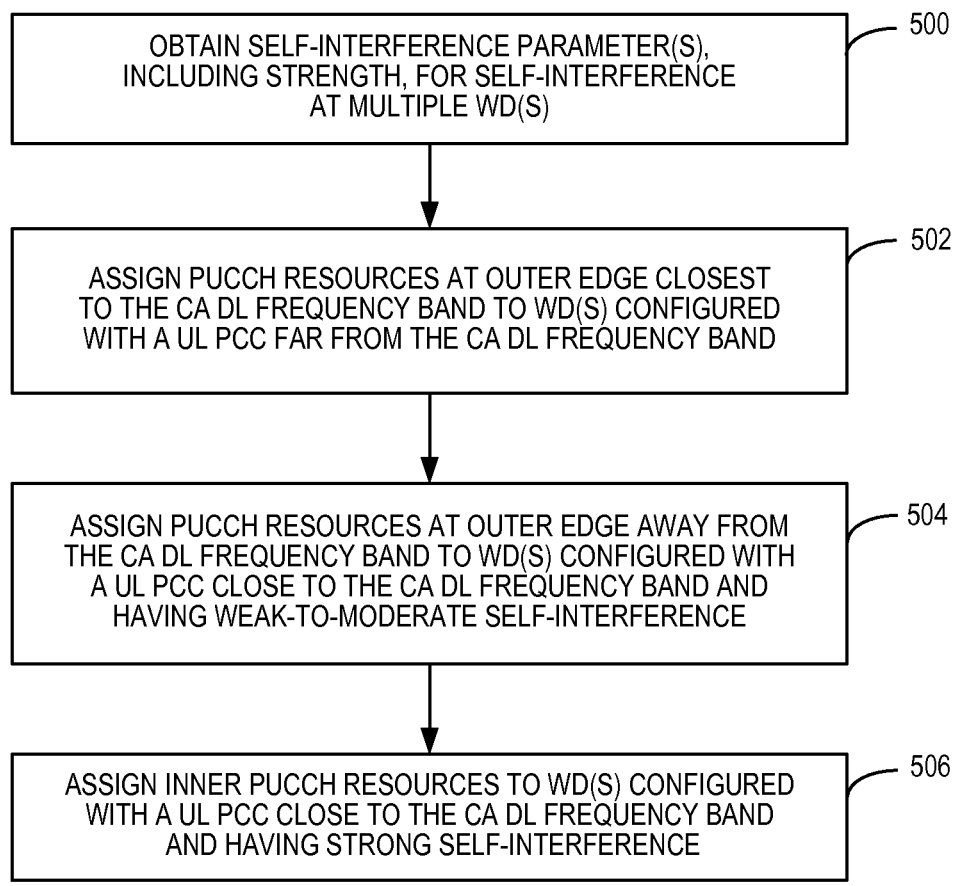
FIG. 19 illustrates a process for mitigating self-interference at a number of wireless devices by controlling PUCCH resource allocation such that the wireless devices with strong interference are assigned inner PUCCH resources according to another embodiment of the present disclosure.

FIG. 19 illustrates a process for mitigating self-interference by controlling PUCCH resource allocation according to another embodiment of the present disclosure. This embodiment is similar to that of FIG. 18 but where the locations of the UL PCCs are considered. Specifically, as illustrated in FIG. 10, uplink transmission in the UL PCCs located far from the CA downlink frequency band result in weak or no self-interference. This is taken into consideration for the PUCCH resource allocation process of FIG. 19. This process is preferably performed by a network node (e.g., the base station 12) but may alternatively be performed by multiple network nodes (e.g., the base station 12 and the wireless device 14) in a distributed manner.

First, one or more self-interference parameters, including strength, for self-interference at the wireless devices 14 resulting from hypothesized or actual uplink transmissions by the wireless devices 14 using edge PUCCH resources are obtained (step 500). The one or more self-interference parameters may further include frequency locations of the self-interference signals. The network node then assigns PUCCH resources at an edge of the UL PCC frequency band closest to the CA downlink frequency band to PUCCH transmissions from the wireless devices 14 with a UL PCC far from the CA downlink frequency band (step 502). The CA downlink frequency band is the frequency band extending from the lowest edge of the lowest DL CC for the system to the highest edge of the highest DL CC for the system. The network node assigns PUCCH resources at an edge of the UL PCC frequency band furthest from the CA downlink frequency band to PUCCH transmissions from the wireless devices 14 with a UL PCC relatively close to the CA downlink frequency band and having weak-to-moderate self-interference (step 504). Conversely, the network node assigns inner PUCCH resources to PUCCH transmissions from the wireless devices 14 with a UL PCC relatively close to the CA downlink frequency band and having strong self-interference (step 506).

Figure 20:
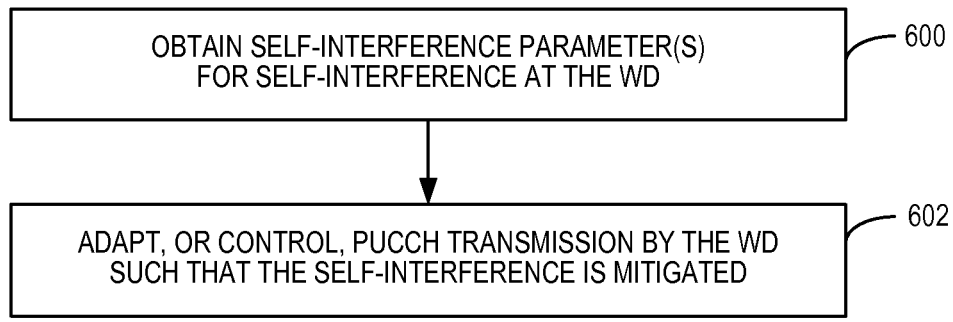
FIG. 20 illustrates a process for mitigating self-interference at the wireless device of FIG. 13 by adapting PUCCH transmission by the wireless device according to one embodiment of the present disclosure.

FIG. 20 illustrates a process for mitigating self-interference by controlling, or adapting, PUCCH transmission by the wireless device 14 according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 resulting from a hypothesized or actual uplink transmission by the wireless device 14 using an edge PUCCH resource of the UL PCC are obtained (step 600). The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the edge PUCCH resource is present in the frequency band of the DL SCC of the wireless device 14 (i.e., the self-interference is in or overlaps the frequency band of the DL SCC). As such, the network node controls, or adapts, PUCCH transmission by the wireless device 14 such that the self-interference is mitigated (step 602). In one embodiment, PUCCH transmission by the wireless device 14 is adapted only if the strength of the self-interference is strong. In another embodiment, PUCCH transmission by the wireless device 14 is controlled based on the strength of the self-interference. PUCCH transmission by the wireless device 14 is adapted to avoid having self-interference present in the frequency band of the DL SCC or to reduce the strength of the self-interference present in the frequency band of the DL SCC. In one embodiment, the network node adapts the PUCCH transmission by adapting periodic or aperiodic CSI reporting to avoid the self-interference. For example, CSI reporting may be skipped such that the corresponding PUCCH transmission (PUCCH Format 2) is avoided in a subframe where the PUCCH transmission would result in self-interference in the downlink frequency band. This would be particularly beneficial if, for instance, it is important to protect PDSCH and/or PDCCH reception at the wireless device 14.

Figure 21:
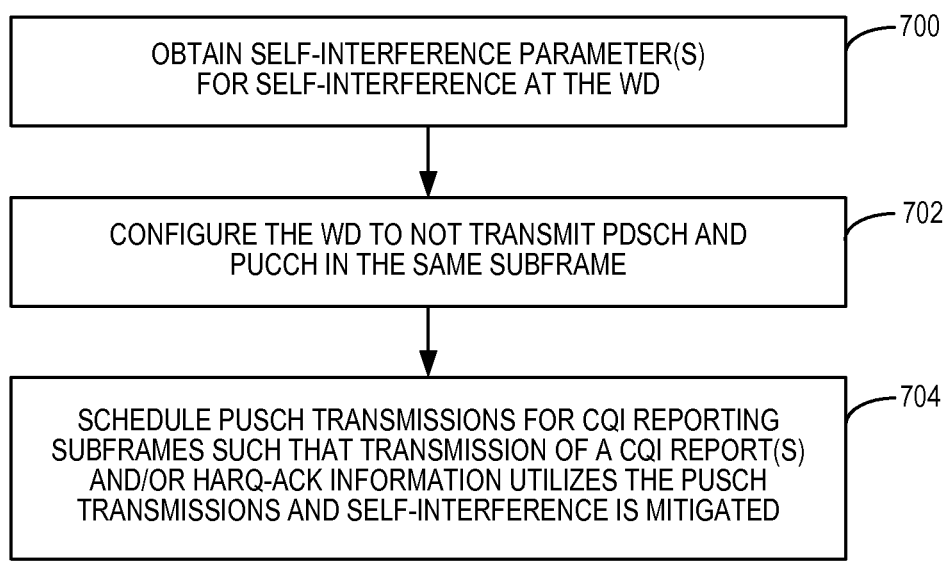
FIG. 21 illustrates a process for mitigating self-interference at the wireless device of FIG. 13 by adapting PUCCH transmission by the wireless device according to another embodiment of the present disclosure.

FIG. 21 illustrates a process for mitigating self-interference by controlling, or adapting, PUCCH transmission by the wireless device 14 according to another embodiment of the present disclosure. This embodiment is similar to that of FIG. 20 but where the PUCCH transmission by the wireless device 14 is controlled, or adapted, by scheduling PUSCH transmissions in CSI reporting subframes to thereby avoid PUCCH transmissions using the edge resources of the UL PCC, which in turn avoids self-interference in the frequency band of the DL SCC as illustrated above with respect to Cases 3 and 6 of FIG. 14.

More specifically, in this embodiment, the network node obtains one or more self-interference parameters for self-interference at the wireless device 14 resulting from a hypothesized or actual uplink transmission by the wireless device 14 using an edge PUCCH resource of the UL PCC (step 700). The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the edge PUCCH resource is present in the frequency band of the DL SCC of the wireless device 14 (i.e., the self-interference is in or overlaps the frequency band of the DL SCC). As such, the network node configures the wireless device 14 to not transmit PDSCH and PUCCH in the same subframe, if needed (step 702). The network node then schedules PUSCH transmissions for CSI reporting subframes in the UL PCC of the wireless device 14 such that transmission of CSI reports and/or HARQ-ACK information by the wireless device 14 utilizes the PUSCH transmissions rather than PUCCH transmissions at the edge of the UL PCC (step 704). The PUSCH transmissions are scheduled on inner uplink resources (i.e., uplink resources that are sufficiently far from the channel edge to mitigate the self-interference). As a result, self-interference is mitigated. The PUSCH transmissions are scheduled for PUSCH resources that mitigate, or all together avoid, self-interference at the wireless device 14.

The process of FIG. 21 is beneficial because CSI reporting is configured on a semi-static basis using RRC signaling. As such, it may not be possible or practical to stop CSI reporting on PUCCH Format 2 on a subframe time scale. Further, in some subframes, the wireless device 14 may generate HARQ-ACK feedback in response to downlink receptions in earlier subframes. The HARQ-ACK feedback is transmitted via PUCCH Format 1a/1b or together with CSI via PUCCH Format 2a/2b. Thus, as described above, when strong self-interference in the frequency band of the DL SCC would result from the PUCCH transmission of CSI or CSI together with HARQ-ACK feedback using PUCCH Format 2/2a/2b on the UL PCC, PUSCH transmissions are scheduled for the wireless device 14 such that the CSI or CSI together with HARQ-ACK feedback are transmitted in PUSCH transmission(s) using inner uplink resources rather than PUCCH transmission(s) using edge resources of the UL PCC. As a result, self-interference is mitigated.

Figure 22:
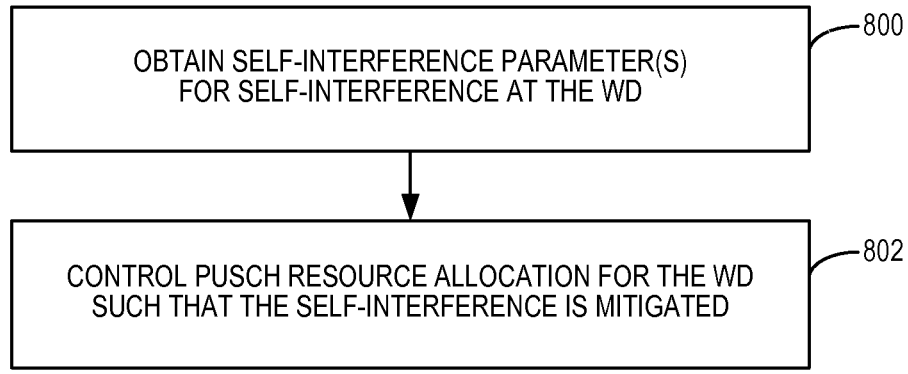
FIG. 22 illustrates a process for mitigating self-interference at the wireless device of FIG. 13 by controlling Physical Uplink Shared Channel (PUSCH) resource allocation according to one embodiment of the present disclosure.
Figure 23:
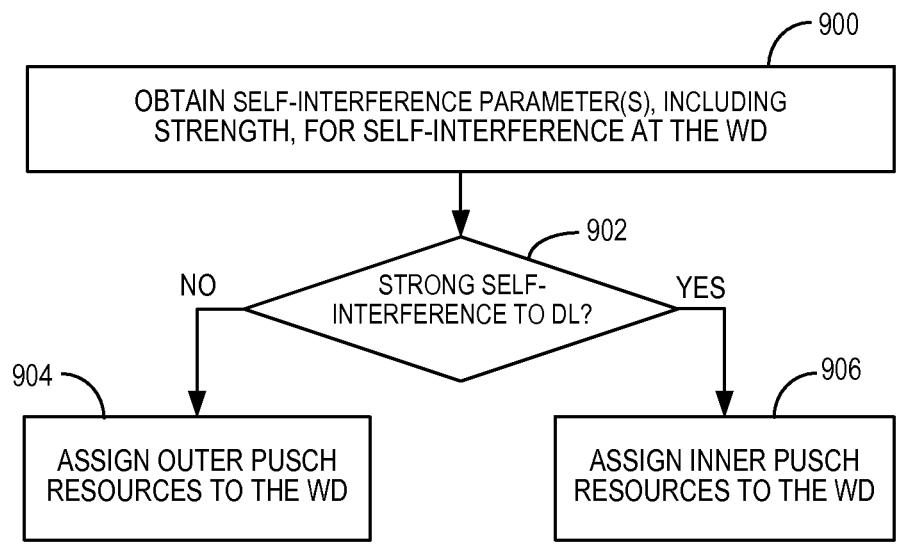
FIG. 23 illustrates a process for mitigating self-interference at the wireless device of FIG. 13 by controlling PUSCH resource allocation based on a strength of the self-interference according to one embodiment of the present disclosure.
Figure 24:
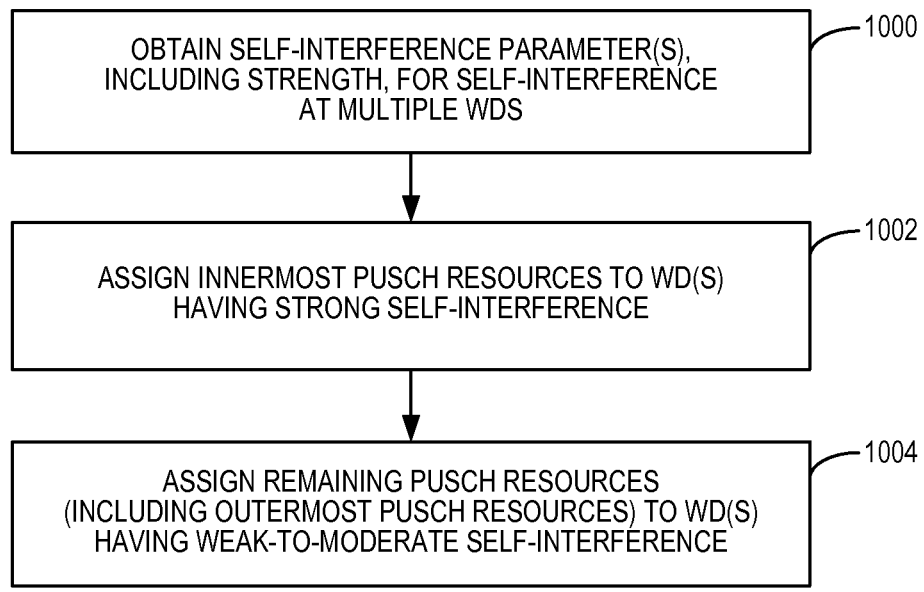
FIG. 24 illustrates a process for mitigating self-interference at a number of wireless devices by controlling PUSCH resource allocation such that wireless devices with strong self-interference are assigned inner PUSCH resources according to one embodiment of the present disclosure.

While FIGS. 16 through 21 are embodiments directed to mitigating self-interference by controlling PUCCH resource allocation or adapting PUCCH transmission, FIGS. 22 through 24 illustrate embodiments in which self-interference is mitigated by controlling PUSCH resource allocation or adapting PUSCH transmission. In particular, FIG. 22 illustrates a process for mitigating self-interference by controlling PUSCH resource allocation according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 resulting from a hypothesized or actual uplink transmission by the wireless device 14 on the UL PCC using an outer resource PUSCH resource are obtained (step 800). The outer PUSCH resource may be an edge resource of the UL PCC if PUCCH is not transmitted. Conversely, if PUCCH is present, the outer PUSCH resource may be a PUSCH resource near the edge of the UL PCC (e.g., an outermost PUSCH resource). The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the outer PUSCH resource is present in the frequency band of the DL SCC of the wireless device 14 (i.e., the self-interference is in or overlaps the downlink frequency band of the DL SCC). As such, the network node controls PUSCH resource allocation for the wireless device 14 such that the self-interference is mitigated (step 802). In one embodiment, PUSCH resource allocation is controlled only if the strength of the self-interference is strong. In another embodiment, PUSCH resource allocation is controlled based on the strength of the self-interference. PUSCH resource allocation is controlled such that PUSCH transmission by the wireless device 14 is assigned to inner PUSCH resources (i.e., PUSCH resources that are sufficiently far from the edge of the UL PCC channel to avoid or otherwise mitigate resulting self-interference).

FIG. 23 illustrates a process for mitigating self-interference by controlling PUSCH resource allocation according to another embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters, including strength, for self-interference at the wireless device 14 resulting from a hypothesized or actual uplink transmission by the wireless device 14 on the UL PCC using an outer PUSCH resource are obtained (step 900). The one or more self-interference parameters may further include a frequency location of the self-interference.

The network nodes then determines whether the hypothesized or actual uplink transmission by the wireless device 14 using the outer PUSCH resource results in strong self-interference in the frequency band of the DL SCC of the wireless device 14 (step 902). More specifically, the network node determines whether the frequency location of the self-interference resulting from the hypothesized or actual uplink transmission using the outer PUSCH resource is within or overlaps the frequency band of the DL SCC and, if so, whether the strength of the self-interference is greater than a defined threshold indicative of strong self-interference. In one embodiment, the threshold for strong self-interference is represented as a signal-to-(self)-interference ratio, which is a ratio of a downlink received signal power at the wireless device 14 to the strength of the self-interference. The strength of the self-interference is then greater than the defined threshold if the signal-to-(self)-interference ratio is less than a defined signal-to-(self)-interference threshold. Note that the received signal power in the DL SCC channel can be estimated by the base station 12 based on a RSRP report that is sent from the wireless device 14 to the base station 12.

If the self-interference resulting from the hypothesized or actual uplink transmission using the outer PUSCH resource is either not in or overlapping the frequency band of the DL SCC or not strong, outer PUSCH resources (e.g., outermost PUSCH resources) are assigned to PUSCH transmissions by the wireless device 14 (step 904). Otherwise, if the self-interference is in or overlaps the frequency band of the DL SCC and is strong, inner PUSCH resources are assigned to PUSCH transmissions by the wireless device 14 (step 906). Again, the inner PUSCH resources are PUSCH resources that are sufficiently far from the edge of the UL PCC channel to avoid or otherwise mitigate self-interference. In this manner, PUSCH transmissions resulting in strong self-interference are avoided.

FIG. 24 illustrates a process for mitigating self-interference by controlling PUSCH resource allocation according to another embodiment of the present disclosure. This embodiment is similar to that of FIG. 23 but where PUSCH resource allocation is controlled for multiple wireless devices 14. This process is preferably performed by a network node (e.g., the base station 12) but may alternatively be performed by multiple network nodes (e.g., the base station 12 and the wireless device 14) in a distributed manner. First, one or more self-interference parameters, including strength, for self-interference at the wireless devices 14 resulting from hypothesized or actual uplink transmissions by the wireless devices 14 using outer PUSCH resources in the UL PCCs of the wireless devices 14 are obtained (step 1000). Notably, the wireless devices 14 may have the same UL PCC or different UL PCCs. Likewise, the wireless devices 14 may have the same DL SCC or different DL SCCs. The one or more self-interference parameters may further include frequency locations of the self-interference signals. The network node then assigns innermost PUSCH resources to the wireless devices 14 having strong self-interference (step 1002) and assigns the remaining PUSCH resources including outermost PUSCH resources to the wireless devices 14 having weak-to-moderate self-interference (step 1004).

Figure 25:
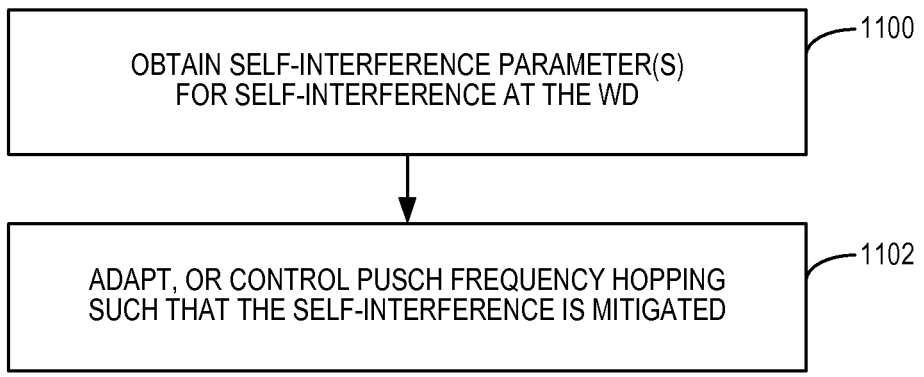
FIG. 25 illustrates a process for mitigating self-interference at the wireless device of FIG. 13 by adapting PUSCH transmission by the wireless device according to one embodiment of the present disclosure.

FIG. 25 illustrates a process for mitigating self-interference by controlling, or adapting, PUSCH transmission by the wireless device 14 according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 resulting from a hypothesized or actual uplink transmission by the wireless device 14 using an outer PUSCH resource of the UL PCC are obtained (step 1100). The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the outer PUSCH resource is present in the frequency band of the DL SCC of the wireless device 14 (i.e., the self-interference is in or overlaps the frequency band of the DL SCC). As such, the network node controls, or adapts, PUSCH frequency hopping for PUSCH transmission(s) by the wireless device 14 such that the self-interference is mitigated (step 1102). In one embodiment, PUSCH frequency hopping is adapted only if the strength of the self-interference is strong. More specifically, in one particular embodiment, for PUSCH frequency hopping type 0, PUSCH frequency hopping can be dynamically enabled to avoid self-interference at the same frequency location in both slots of the corresponding subframe. In another particular embodiment, for PUSCH frequency hopping type 1, the frequency hopping pattern and/or a mirroring pattern for the frequency hopping can be enabled in a semi-static manner such that self-interference at the same frequency location for both slots is avoided.

Figure 26:
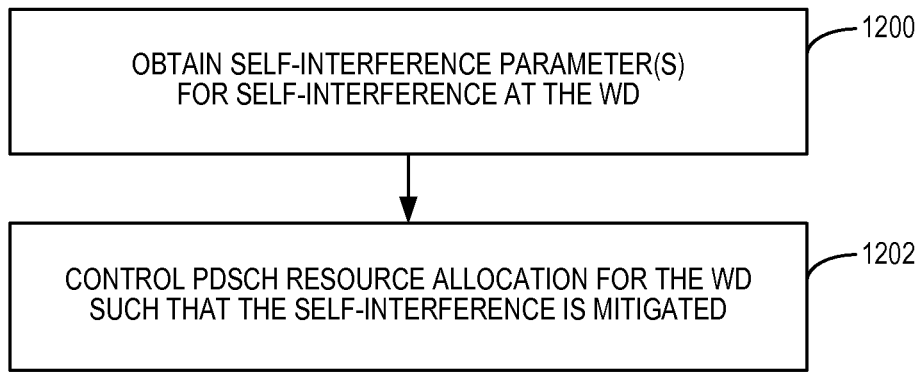
FIG. 26 illustrates a process for mitigating self-interference at a number of wireless devices by controlling Physical Downlink Shared Channel (PDSCH) resource allocation according to one embodiment of the present disclosure.

FIG. 26 illustrates a process for mitigating self-interference by controlling PDSCH resource allocation according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 resulting from a hypothesized or actual uplink transmission by the wireless device 14 on the UL PCC using an outer resource of the UL PCC are obtained (step 1200). In one embodiment, the outer resource of the UL PCC is an edge resource of the UL PCC. The outer resource may alternatively be an outer resource of the UL PCC that is near, but not at, the edge of the UL PCC. The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the outer resource of the UL PCC is present in the frequency band of the DL SCC of the wireless device 14 (i.e., the self-interference is in or overlaps the downlink frequency band of the DL SCC). As such, the network node controls PDSCH resource allocation for downlink transmission from the base station 12 to the wireless device 14 such that the self-interference is mitigated (step 1202). In one embodiment, PDSCH resource allocation is controlled only if the strength of the self-interference is strong. PDSCH resource allocation is controlled such that PDSCH resources allocated for a downlink transmission to and reception by the wireless device 14 avoid the self-interference and, in one embodiment, are as far from the frequency location of the self-interference as possible. Further, the remaining PDSCH resources, including those at or near the frequency location of the self-interference, can be allocated to other wireless devices 14 having weak or no self-interference. Note that the process of FIG. 26 can additionally or alternatively be applied to ePDCCH resource allocation. In particular, the ePDCCH set for the wireless device 14 can be configured such that the ePDCCH resources assigned to the wireless device 14 avoid, and in one embodiment are as far as possible from, the self-interference.

Figure 27:
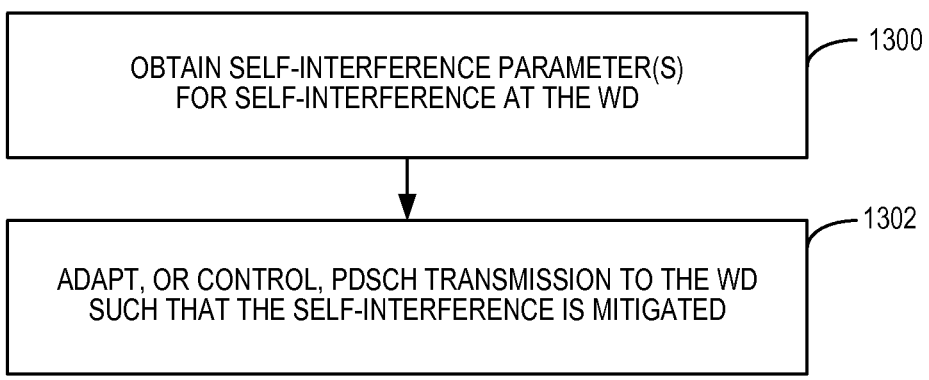
FIG. 27 illustrates a process for mitigating self-interference at the wireless device of FIG. 13 by adapting PDSCH transmission to or PDSCH reception by the wireless device according to one embodiment of the present disclosure.

FIG. 27 illustrates a process for mitigating self-interference by controlling, or adapting, PDSCH transmission by the wireless device 14 according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 resulting from a hypothesized or actual uplink transmission by the wireless device 14 on the UL PCC using an outer resource of the UL PCC are obtained (step 1300). In one embodiment, the outer resource of the UL PCC is an edge resource of the UL PCC. The outer resource may alternatively be an outer resource of the UL PCC that is near, but not at, the edge of the UL PCC. The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the outer resource of the UL PCC is present in the frequency band of the DL SCC of the wireless device 14 (i.e., the self-interference is in or overlaps the downlink frequency band of the DL SCC). As such, the network node controls, or adapts, PDSCH transmission from the base station 12 to the wireless device 14 such that the self-interference is mitigated (step 1302). In one embodiment, PDSCH transmission from the base station 12 to the wireless device 14 is adapted only if the strength of the self-interference is strong. In one embodiment, PDSCH transmission from the base station 12 to the wireless device 14 is adapted to mitigate the self-interference by adapting a transport format of the PDSCH. In one particular embodiment, the transport format of the PDSCH is adapted based on the strength of the self-interference such that the stronger the self-interference (i.e., the lower the signal-to-(self)-interference ratio), the lower the rate of the transport format. In addition or alternatively, a precoding rank of the PDSCH may be adapted depending on the strength of the self-interference such that the stronger the self-interference (i.e., the lower the signal-to-(self)-interference ratio), the lower the precoding rank.

Figure 28:
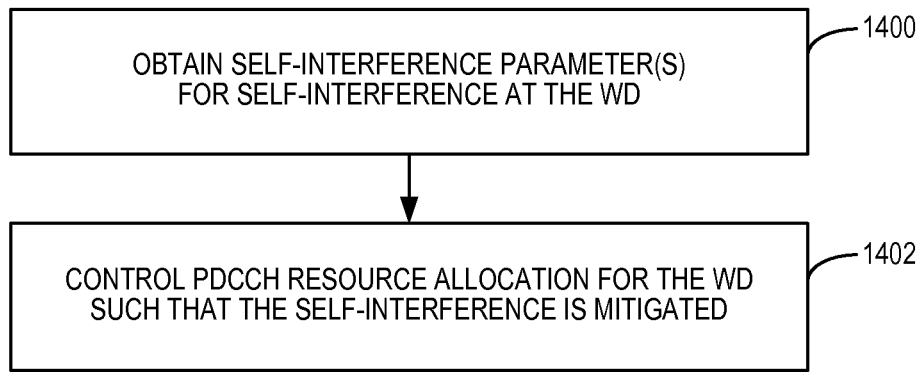
FIG. 28 illustrates a process for mitigating self-interference at a number of wireless devices by controlling PDCCH resource allocation according to one embodiment of the present disclosure.

FIG. 28 illustrates a process for mitigating self-interference by controlling PDCCH resource allocation according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 resulting from a hypothesized or actual uplink transmission by the wireless device 14 on the UL PCC using an outer resource of the UL PCC are obtained (step 1400). In one embodiment, the outer resource of the UL PCC is an edge resource of the UL PCC. The outer resource may alternatively be an outer resource of the UL PCC that is near, but not at, the edge of the UL PCC. The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the outer resource of the UL PCC is present in the frequency band of the DL SCC of the wireless device 14 (i.e., the self-interference is in or overlaps the downlink frequency band of the DL SCC). As such, the network node controls PDCCH resource allocation for the wireless device 14 such that the self-interference is mitigated (step 1402). In one embodiment, PDCCH resource allocation is controlled only if the strength of the self-interference is strong. PDCCH resource allocation is controlled such that PDCCH resources allocated for downlink transmission to and reception by the wireless device 14 are on a far-off DL CC (e.g., the DL PCC) in which the self-interference is not present or is weak rather than in the DL SCC in which the self-interference is strong. Note that cross-carrier scheduling enables the PDCCH to provide control information for both the DL PCC and the DL SCC.

Figure 29:
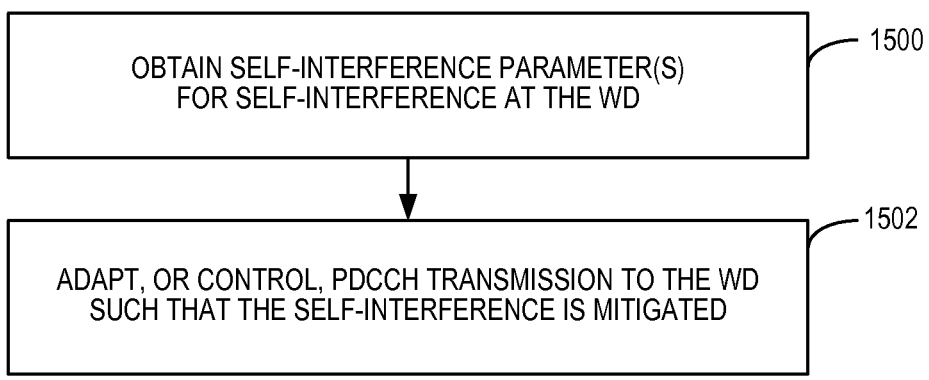
FIG. 29 illustrates a process for mitigating self-interference at the wireless device of FIG. 13 by adapting PDCCH transmission to or PDCCH reception by the wireless device according to one embodiment of the present disclosure.

FIG. 29 illustrates a process for mitigating self-interference by controlling, or adapting, PDCCH transmission by the wireless device 14 according to one embodiment of the present disclosure. This process is preferably performed by a network node (e.g., the base station 12 or the wireless device 14) but may alternatively be performed by multiple network nodes (e.g., the base station 12 and the wireless device 14) in a distributed manner. First, one or more self-interference parameters for self-interference at the wireless device 14 resulting from a hypothesized or actual uplink transmission by the wireless device 14 on the UL PCC using an outer resource of the UL PCC are obtained (step 1500). In one embodiment, the outer resource of the UL PCC is an edge resource of the UL PCC. The outer resource may alternatively be an outer resource of the UL PCC that is near, but not at, the edge of the UL PCC. The one or more self-interference parameters include a frequency location of the self-interference and/or a strength of the self-interference. Notably, in one preferred embodiment, the self-interference parameters include both the frequency location and the strength of the self-interference.

In this embodiment, the self-interference resulting from the hypothesized or actual uplink transmission using the outer resource of the UL PCC is present in the frequency band of the DL SCC of the wireless device 14 (i.e., the self-interference is in or overlaps the downlink frequency band of the DL SCC). As such, the network node controls, or adapts, PDCCH transmission from the base station 12 to the wireless device 14 such that the self-interference is mitigated (step 1502). In one embodiment, PDCCH transmission by the wireless device 14 is adapted only if the strength of the self-interference is strong. In one embodiment, PDCCH transmission from the base station 12 to the wireless device 14 is adapted to mitigate the self-interference by adapting an aggregation level of the PDCCH depending on the self-interference and, in particular, depending on the strength of the self-interference such that the aggregation level increases as the strength of the self-interference increases. Degradation in the downlink performance of the wireless device 14 can be mitigated by increasing the aggregation level of the PDCCH. Note that increasing the aggregation level is equivalent to lowering the code rate, which generally makes PDCCH more robust against interference.

Figure 30:
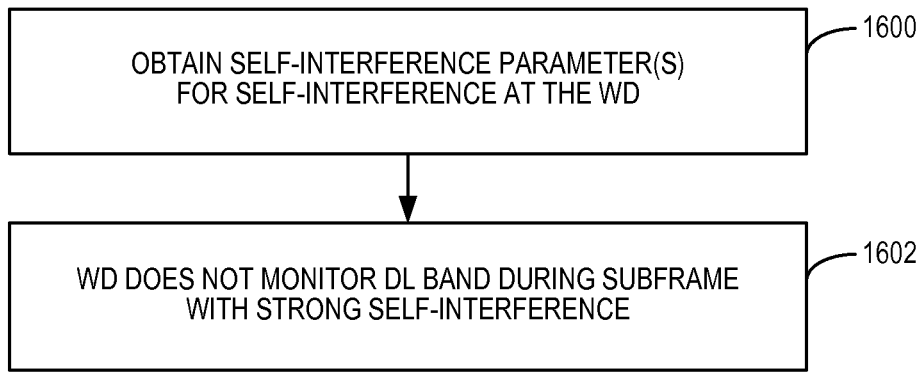
FIG. 30 illustrates a process for mitigating self-interference at the wireless device of FIG. 13 in which the wireless device does not monitor a downlink frequency band during a subframe in which the self-interference is present according to one embodiment of the present disclosure.

The embodiments of FIGS. 16 through 29, or at least the control or adapting of the various uplink or downlink channels, is preferably performed by the base station 12, but is not limited thereto. FIGS. 30 through 33 are embodiments in which the wireless device 14 performs different actions to mitigate self-interference. In particular, FIG. 30 illustrates a process in which the wireless device 14 mitigates self-interference by not monitoring the DL SCC during a subframe in which strong self-interference is present according to one embodiment of the present disclosure. More specifically, one or more self-interference parameters for self-interference at the wireless device 14 resulting from a hypothesized or actual uplink transmission by the wireless device 14 on the UL PCC are obtained (step 1600). The one or more self-interference parameters include a frequency location of the self-interference and/or a strength of the self-interference. Notably, in one preferred embodiment, the self-interference parameters include both the frequency location and the strength of the self-interference. The one or more self-interference parameters may be determined by the wireless device 14 or determined by another network node, such as the base station 12.

In this embodiment, the self-interference resulting from the hypothesized or actual uplink transmission is present in the downlink frequency band, which in this embodiment is frequency band of the DL SCC of the wireless device 14 (i.e., the self-interference is in or overlaps the downlink frequency band of the DL SCC) and is strong. As such, in order to mitigate the self-interference, the wireless device 14 does not monitor the DL SCC during a subframe in which the self-interference is strong (step 1602). In this manner, self-interference is mitigated. It may be beneficial to mitigate self-interference in this manner when, for example, the wireless device 14 needs to report high-priority feedback to the base station 12 such as, for instance, HARQ-ACK or a RI.

Figure 31:
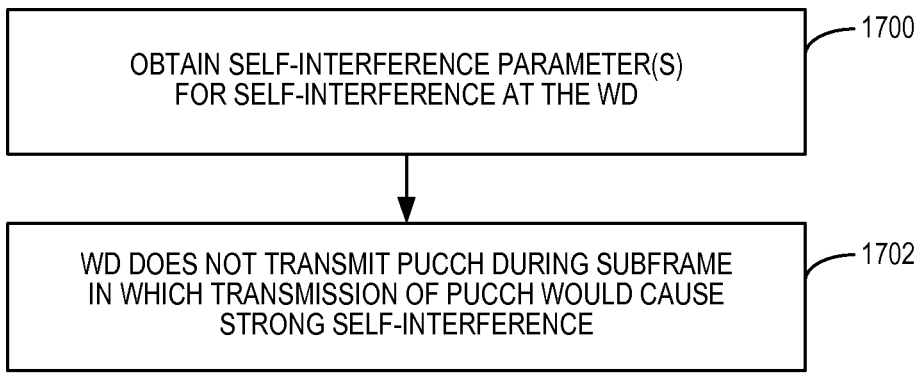
FIG. 31 illustrates a process for mitigating self-interference at the wireless device of FIG. 13 in which the wireless device does not transmit PUCCH during a subframe in which transmission of PUCCH by the wireless device results in self-interference according to one embodiment of the present disclosure.

FIG. 31 illustrates a process in which the wireless device 14 mitigates self-interference by not transmitting PUCCH during a subframe in which the PUCCH transmission would result in strong self-interference according to one embodiment of the present disclosure. More specifically, one or more self-interference parameters for self-interference at the wireless device 14 resulting from a hypothesized or actual uplink transmission by the wireless device 14 on the UL PCC are obtained (step 1700). The one or more self-interference parameters include a frequency location of the self-interference and/or a strength of the self-interference. Notably, in one preferred embodiment, the self-interference parameters include both the frequency location and the strength of the self-interference. The one or more self-interference parameters may be determined by the wireless device 14 or determined by another network node, such as the base station 12.

In this embodiment, the self-interference resulting from the hypothesized or actual uplink transmission is present in the frequency band of the DL SCC of the wireless device 14 (i.e., the self-interference is in or overlaps the downlink frequency band of the DL SCC) and is strong. As such, in order to mitigate the self-interference, the wireless device 14 does not transmit PUCCH on the UL PCC during a subframe in which a PUCCH transmission would result in strong self-interference (step 1702). In this manner, self-interference is mitigated. It may be beneficial to mitigate self-interference in this manner when, for example, the wireless device 14 is reporting lower-priority feedback such as, for instance, periodic CSI.

Figure 32:
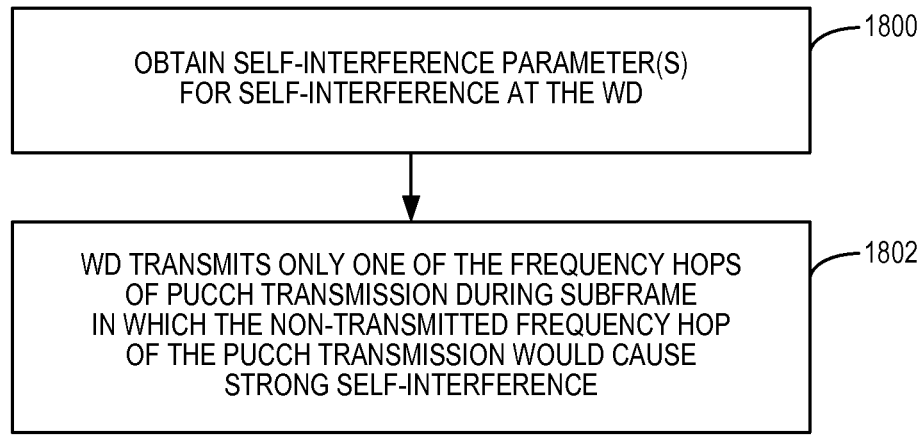
FIG. 32 illustrates a process for mitigating self-interference at the wireless device of FIG. 13 in which the wireless device transmits only one of two or more PUCCH frequency hops during a subframe in which transmission of all of the PUCCH frequency hops by the wireless device would result in self-interference according to one embodiment of the present disclosure.

FIG. 32 illustrates a process in which the wireless device 14 mitigates self-interference by transmitting only one of the frequency hops of a PUCCH transmission during a subframe in which transmission of both frequency hops of the PUCCH transmission would result in strong self-interference according to one embodiment of the present disclosure. More specifically, one or more self-interference parameters for self-interference at the wireless device 14 resulting from a hypothesized or actual uplink transmission by the wireless device 14 on the UL PCC are obtained (step 1800). The one or more self-interference parameters include a frequency location of the self-interference and/or a strength of the self-interference. Notably, in one preferred embodiment, the self-interference parameters include both the frequency location and the strength of the self-interference. The one or more self-interference parameters may be determined by the wireless device 14 or determined by another network node, such as the base station 12.

In this embodiment, the self-interference resulting from the hypothesized or actual uplink transmission is present in the frequency band of the DL SCC of the wireless device 14 (i.e., the self-interference is in or overlaps the downlink frequency band of the DL SCC) and is strong. As such, in order to mitigate the self-interference, the wireless device 14 transmits only one of the two PUCCH frequency hops during a subframe in which transmission of both PUCCH frequency hops would result in strong self-interference (step 1802). Further, the PUCCH frequency hop that is transmitted is the frequency hop that results in weaker self-interference (e.g., the CIM3 component rather than the IM3 component). In this manner, self-interference is mitigated.

Figure 33:
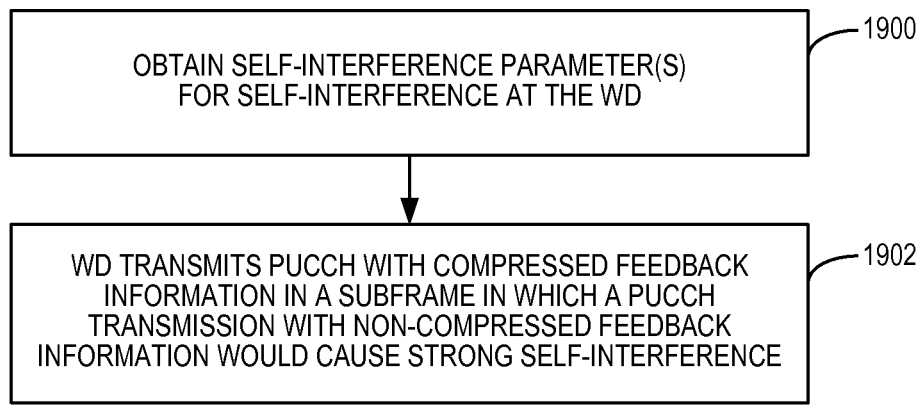
FIG. 33 illustrates a process for mitigating self-interference at the wireless device of FIG. 13 in which the wireless device transmits PUCCH with compressed feedback information according to one embodiment of the present disclosure.

FIG. 33 illustrates a process in which the wireless device 14 mitigates self-interference by transmitting PUCCH with compressed feedback information during a subframe in which transmission of PUCCH with non-compressed feedback information would result in strong self-interference according to one embodiment of the present disclosure. More specifically, one or more self-interference parameters for self-interference at the wireless device 14 resulting from a hypothesized or actual uplink transmission by the wireless device 14 on the UL PCC are obtained (step 1900). The one or more self-interference parameters include a frequency location of the self-interference and/or a strength of the self-interference. Notably, in one preferred embodiment, the self-interference parameters include both the frequency location and the strength of the self-interference. The one or more self-interference parameters may be determined by the wireless device 14 or determined by another network node, such as the base station 12.

In this embodiment, the self-interference resulting from the hypothesized or actual uplink transmission is present in the frequency band of the DL SCC of the wireless device 14 (i.e., the self-interference is in or overlaps the downlink frequency band of the DL SCC) and is strong. As such, in order to mitigate the self-interference, the wireless device 14 transmits PUCCH with compressed feedback information during a subframe in which PUCCH with non-compressed feedback information would result in strong self-interference (step 1902). For example, if the wireless device 14 would normally transmit both CSI and HARQ-ACK feedback on PUCCH Format 2a/2b, the feedback information may be compressed such that the wireless device 14 transmits only the HARQ-ACK feedback on PUCCH Format 1a/1b during the subframe. The PUCCH Format 1a/1b transmission can be transmitted an uplink resource away from the edge of the UL PCC channel and, as such, self-interference is mitigated.

Figure 34:
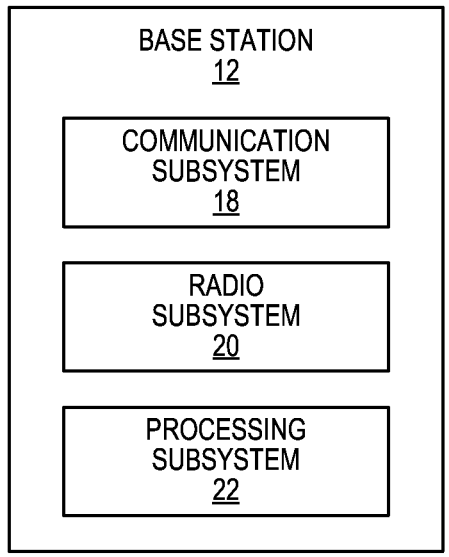
FIG. 34 is a block diagram of the base station of FIG. 13 according to one embodiment of the present disclosure.

FIG. 34 is a block diagram of the base station 12 of FIG. 13 according to one embodiment of the present disclosure. As illustrated, the base station 12 includes a communication subsystem 18, a radio subsystem 20, and a processing subsystem 22. The communication subsystem 18 generally includes analog, and in some embodiments, digital components for sending and receiving communications from other base stations 12 and/or a core network of the cellular communications network 10.

The radio subsystem 20 generally includes analog and, in some embodiments, digital components for sending and receiving data to and from wireless devices, such as the wireless devices 16, within the corresponding cell 16. In particular embodiments, the radio subsystem 20 may represent or include one or more Radio Frequency (RF) transceiver(s), or separate RF transmitter(s) and receiver(s), capable of transmitting suitable information wirelessly to and receiving suitable information from other network components or nodes. From a wireless communications protocol view, the radio subsystem 20 implements at least part of Layer 1 (i.e., the Physical or "PHY" Layer).

The processing subsystem 22 generally implements any remaining portion of Layer 1 not implemented in the radio subsystem 20 as well as functions for higher layers in the wireless communications protocol (e.g., Layer 2 (data link layer), Layer 3 (network layer), etc.). In particular embodiments, the processing subsystem 22 may comprise, for example, one or several general-purpose or special-purpose microprocessors or other microcontrollers programmed with suitable software and/or firmware to carry out some or all of the functionality of the base station 12 described herein. In addition or alternatively, the processing subsystem 22 may comprise various digital hardware blocks (e.g., one or more ASICs, one or more off-the-shelf digital and analog hardware components, or a combination thereof) configured to carry out some or all of the functionality of the base station 12 described herein. Additionally, in particular embodiments, the above described functionality of the base station 12 may be implemented, in whole or in part, by the processing subsystem 22 executing software or other instructions stored on a non-transitory computer-readable medium, such as Random Access Memory (RAM), Read Only Memory (ROM), a magnetic storage device, an optical storage device, or any other suitable type of data storage components.

Figure 35:
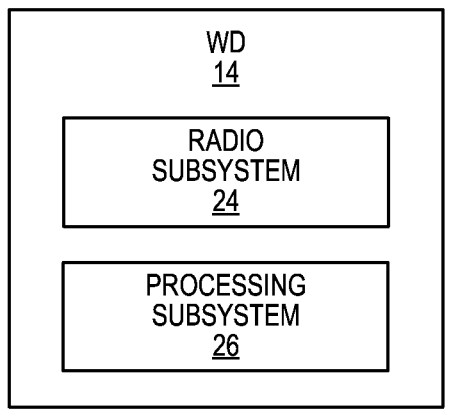
FIG. 35 is a block diagram of the wireless device of FIG. 13 according to one embodiment of the present disclosure.

FIG. 35 is a block diagram of one of the wireless devices 14 of FIG. 13 according to one embodiment of the present disclosure. As illustrated, the wireless device 14 includes a radio subsystem 24 and a processing subsystem 26. The radio subsystem 24 generally includes analog and, in some embodiments, digital components for sending and receiving data to and from the base stations 12. In particular embodiments, the radio subsystem 24 may represent or include one or more RF transceivers, or separate RF transmitter(s) and receiver(s), capable of transmitting suitable information wirelessly to and receiving suitable information from other network components or nodes. From a wireless communications protocol view, the radio subsystem 24 implements at least part of Layer 1 (i.e., the Physical or "PHY" Layer).

The processing subsystem 26 generally implements any remaining portion of Layer 1 as well as functions for higher layers in the wireless communications protocol (e.g., Layer 2 (data link layer), Layer 3 (network layer), etc.). In particular embodiments, the processing subsystem 26 may comprise, for example, one or several general-purpose or special-purpose microprocessors or other microcontrollers programmed with suitable software and/or firmware to carry out some or all of the functionality of the wireless device 14 described herein. In addition or alternatively, the processing subsystem 26 may comprise various digital hardware blocks (e.g., one or more ASICs, one or more off-the-shelf digital and analog hardware components, or a combination thereof) configured to carry out some or all of the functionality of the wireless device 14 described herein. Additionally, in particular embodiments, the above described functionality of the wireless device 14 may be implemented, in whole or in part, by the processing subsystem 26 executing software or other instructions stored on a non-transitory computer-readable medium, such as RAM, ROM, a magnetic storage device, an optical storage device, or any other suitable type of data storage components. Of course, the detailed operation for each of the functional protocol layers, and thus the radio subsystem 24 and the processing subsystem 26, will vary depending on both the particular implementation as well as the standard or standards supported by the wireless device 14.

The following acronyms are used throughout this disclosure.

3GPP 3$^{rd}$ Generation Partnership Project
ACK Acknowledgement
AL Aggregation Level
ARQ Automatic Repeat Request
ASIC Application Specific Integrated Circuit
BW Bandwidth
CA Carrier Aggregation
CC Component Carrier
CCE Control Channel Element
CFI Control Format Indicator
CIF Carrier Indicator Field
CIM3 Counter Third-Order Intermodulation
CIM5 Counter Fifth-Order Intermodulation
CQI Channel Quality Indicator
CRS Common Reference Symbol
CSI Channel State Information
dB Decibel
dBc Decibel Relative to the Carrier
dBm Decibel-Milliwatt
DCI Downlink Control Information
DFT Discrete Fourier Transform
DL Downlink
DL PCC Downlink Primary Component Carrier
FDD Frequency Division Duplexing
eCCE Enhanced Control Channel Element
eNB Enhanced Node B
ePDCCH Enhanced Physical Downlink Control Channel
HARQ Hybrid Automatic Repeat Request
IM3 Third-Order Intermodulation
IM5 Fifth-Order Intermodulation
IQ In-Phase and Quadrature
LTE Long Term Evolution
LUT Look-Up Table
MAC Media Access Control
MHz Megahertz
MIMO Multiple-Input/Multiple-Output
ms Millisecond
NACK Non-Acknowledgment
OFDM Orthogonal Frequency Division Multiplexing
OIP3 Third-Order Output Intercept Power
PCFICH Physical Control Format Indicator Channel
PDCCH Physical Downlink Control Channel
PDSCH Physical Downlink Shared Channel
PHICH Physical Hybrid Automatic Repeat Request Indication Channel
PHR Power Headroom Report
PMI Precoding Matrix Indicator
PRB Physical Resource Block
PTI Precoding Type Indicator
PUCCH Physical Uplink Control Channel
PUSCH Physical Uplink Shared Channel
RAM Random Access Memory
RB Resource Block
RE Resource Element
REG Resource Element Group
RF Radio Frequency
RI Rank Indication
ROM Read Only Memory
RRC Radio Resource Configuration
RSRP Reference Signal Received Power
SCC Secondary Component Carrier
TDD Time Division Duplexing
UE User Equipment Device
UL Uplink
WD Wireless Device Those skilled in the art will recognize improvements and modifications to the preferred embodiments of the present disclosure. All such improvements and modifications are considered within the scope of the concepts disclosed herein and the claims that follow.

What is claimed is:
1. A method of operation of a network node of a cellular communications network, comprising:

obtaining, by the network node, one or more self-interference parameters for self-interference at a wireless device within a downlink frequency band utilized by the wireless device;

obtaining one or more self-interference parameters for self-interference at one or more additional wireless devices within corresponding downlink frequency bands;

controlling, by the network node, at least one of a group consisting of: uplink transmission by the wireless device, downlink reception by the wireless device, and downlink transmission to the wireless device in such a manner that the self-interference is mitigated, wherein controlling the at least one of the group consisting of: uplink transmission by the wireless device, downlink reception by the wireless device, and downlink transmission to the wireless device comprises: controlling resource allocation for Physical Uplink Control Channel, PUCCH, transmission by the wireless device on an uplink component carrier of the wireless device such that the self-interference is mitigated; and controlling resource allocation for PUCCH transmission by the one or more additional wireless devices in corresponding uplink frequency bands such that the self-interference of the one or more additional wireless devices is mitigated;

wherein controlling the resource allocation for the PUCCH transmission by the wireless device and controlling the resource allocation for the PUCCH transmission by the one or more additional wireless devices includes assigning edge PUCCH resources furthest from the corresponding downlink frequency bands to ones of the wireless device and the one or more additional wireless devices utilizing uplink component carriers closest to the corresponding downlink frequency bands and having weak-to-moderate self-interference.

2. The method of claim 1 wherein the one or more self-interference parameters for self-interference at the wireless device and at the one or more additional wireless devices comprise a frequency location of the self-interference, the frequency location being within the downlink frequency band utilized by the wireless device.

3. The method of claim 1 wherein the one or more self-interference parameters for self-interference at the wireless device and at the one or more additional wireless devices comprise a strength of the self-interference.

4. The method of claim 1 wherein the one or more self-interference parameters for self-interference at the wireless device and at the one or more additional wireless devices comprise a frequency location of the self-interference, the frequency location being within the downlink frequency band utilized by the wireless device, and a strength of the self-interference.

5. The method of claim 1 wherein the self-interference for self-interference at the wireless device and at the one or more additional wireless devices is an actual self-interference caused by an uplink transmission by the wireless device.

6. The method of claim 1 wherein the self-interference for self-interference at the wireless device and at the one or more additional wireless devices is an expected self-interference caused by an uplink transmission by the wireless device.

7. The method of claim 1 wherein the downlink frequency band is frequency band of one of two or more downlink component carriers utilized by the wireless device for downlink carrier aggregation.

8. The method of claim 7 wherein the cellular communications network is a Long Term Evolution cellular communications network.

9. The method of claim 1 wherein controlling resource allocation for the PUCCH transmission by the wireless device comprises assigning inner PUCCH resources for the PUCCH transmission by the wireless device.

10. The method of claim 1 wherein the one or more self-interference parameters comprise a strength of the self-interference, and controlling resource allocation for the PUCCH transmission by the wireless device comprises:

determining that the strength of the self-interference is greater than a threshold strength; and in response, assigning inner PUCCH resources for the PUCCH transmission by the wireless device.

11. The method of claim 1 wherein controlling the resource allocation for the PUCCH transmission by the wireless device and controlling the resource allocation for the PUCCH transmission by the one or more additional wireless devices comprise:

assigning innermost PUCCH resources to ones of the wireless device and the one or more additional wireless devices having strong self-interference.

12. The method of claim 11 wherein controlling the resource allocation for the PUCCH transmission by the wireless device and controlling the resource allocation for the PUCCH transmission by the one or more additional wireless devices further comprise:

assigning outermost PUCCH resources to ones of the wireless device and the one or more additional wireless devices having weak-to-moderate self-interference.

13. The method of claim 1 wherein controlling the resource allocation for the PUCCH transmission by the wireless device and controlling the resource allocation for the PUCCH transmission by the one or more additional wireless devices comprise:

assigning innermost PUCCH resources to ones of the wireless device and the one or more additional wireless devices utilizing uplink component carriers closest to the corresponding downlink frequency bands and having strong self-interference.

14. The method of claim 13 wherein controlling the resource allocation for the PUCCH transmission by the wireless device and controlling the resource allocation for the PUCCH transmission by the one or more additional wireless devices further comprise:

assigning edge PUCCH resources closest to the corresponding downlink frequency bands to ones of the wireless device and the one or more additional wireless devices utilizing uplink component carriers furthest from the corresponding downlink frequency bands and having weak-to-moderate self-interference.

15. The method of claim 1 wherein the downlink frequency band is a frequency band for a secondary downlink component carrier utilized by the wireless device for downlink carrier aggregation, and the self-interference is self-interference in the frequency band for the secondary downlink component carrier resulting from an uplink transmission on a primary component carrier of the wireless device.

16. The method of claim 1 wherein the network node is a base station of the cellular communications network.

17. The method of claim 1 wherein the network node is the wireless device.

18. A base station for a cellular communications network, comprising:
a radio subsystem; and
a processing subsystem associated with the radio subsystem and configured to:
obtain one or more self-interference parameters for self-interference at a wireless device within a downlink frequency band utilized by the wireless device, wherein the downlink frequency band is a frequency band for a secondary downlink component carrier utilized by the wireless device for non-contiguous intra-band downlink carrier aggregation, and the self-interference is self-interference in the frequency band for the secondary downlink component carrier resulting from an uplink transmission by the wireless device on an uplink frequency band of an uplink component carrier utilized by the wireless device for non-contiguous intra-band uplink carrier aggregation; and
control at least one of a group consisting of: uplink transmission by the wireless device and downlink reception by the wireless device in such a manner that the self-interference is mitigated.

19. A wireless device for a cellular communications network, comprising:
a radio subsystem; and
a processing subsystem associated with the radio subsystem and configured to:
obtain one or more self-interference parameters for self-interference at the wireless device within a downlink frequency band utilized by the wireless device wherein the downlink frequency band is a frequency band for a secondary downlink component carrier utilized by the wireless device for non-contiguous intra-band downlink carrier aggregation, and the self-interference is self-interference in the frequency band for the secondary downlink component carrier resulting from an uplink transmission by the wireless device on an uplink frequency band of an uplink component carrier utilized by the wireless device for non-contiguous intra-band uplink carrier aggregation; and
control at least one of a group consisting of: uplink transmission by the wireless device and downlink reception by the wireless device in such a manner that the self-interference is mitigated.

20. The method of claim 1 wherein the downlink frequency band is a frequency band for a secondary downlink component carrier utilized by the wireless device for non-contiguous intra-band downlink carrier aggregation, and the self-interference is self-interference in the frequency band for the secondary downlink component carrier resulting from an uplink transmission by the wireless device on an uplink frequency band of an uplink component carrier utilized by the wireless device for non-contiguous intra-band uplink carrier aggregation.

21. A base station for a cellular communications network, comprising:
a radio subsystem; and
a processing subsystem associated with the radio subsystem and configured to:
obtain one or more self-interference parameters for self-interference at a wireless device within a downlink frequency band utilized by the wireless device;
obtain one or more self-interference parameters for self-interference at one or more additional wireless devices within corresponding downlink frequency bands;
control at least one of a group consisting of: uplink transmission by the wireless device, downlink reception by the wireless device, and downlink transmission to the wireless device in such a manner that the self-interference is mitigated, wherein, when controlling the at least one of the group consisting of: uplink transmission by the wireless device, downlink reception by the wireless device, and downlink transmission to the wireless device, the processing subsystem is configured to: control resource allocation for Physical Uplink Control Channel, PUCCH, transmission by the wireless device on an uplink component carrier of the wireless device such that the self-interference is mitigated; and
control resource allocation for PUCCH transmission by the one or more additional wireless devices in corresponding uplink frequency bands such that the self-interference of the one or more additional wireless devices is mitigated;
wherein when controlling the resource allocation for the PUCCH transmission by the wireless device and controlling the resource allocation for the PUCCH transmission by the one or more additional wireless devices, the processing subsystem is configured to assign edge PUCCH resources furthest from the corresponding downlink frequency bands to ones of the wireless device and the one or more additional wireless devices utilizing uplink component carriers closest to the corresponding downlink frequency bands and having weak-to-moderate self-interference.

22. A method of operation of a network node of a cellular communications network, comprising:
obtaining, by the network node, one or more self-interference parameters for self-interference at a wireless device within a downlink frequency band utilized by the wireless device, wherein the downlink frequency band is a frequency band for a secondary downlink component carrier utilized by the wireless device for non-contiguous intra-band downlink carrier aggregation, and the self-interference is self-interference in the frequency band for the secondary downlink component carrier resulting from an uplink transmission by the wireless device on an uplink frequency band of an uplink component carrier utilized by the wireless device for non-contiguous intra-band uplink carrier aggregation; and
control, by the network node, at least one of a group consisting of: uplink transmission by the wireless device and downlink reception by the wireless device in such a manner that the self-interference is mitigated.

* * * * *